United States Patent
Kojima et al.

(10) Patent No.: US 7,436,754 B2
(45) Date of Patent: Oct. 14, 2008

(54) INFORMATION-RECORDING MEDIUM AND METHOD

(75) Inventors: Kyoko Kojima, Kunitachi (JP); Motoyasu Terao, Hinode (JP)

(73) Assignee: Hitachi, Ltd., Tokyo (JP)

( * ) Notice: Subject to any disclaimer, the term of this patent is extended or adjusted under 35 U.S.C. 154(b) by 727 days.

(21) Appl. No.: 10/959,144

(22) Filed: Oct. 7, 2004

(65) Prior Publication Data

US 2005/0111071 A1    May 26, 2005

(30) Foreign Application Priority Data

Oct. 7, 2003    (JP) ............................. 2003-347766

(51) Int. Cl.
*G11B 7/00* (2006.01)
(52) U.S. Cl. ....................................... 369/126
(58) Field of Classification Search ............. 369/275.1, 369/275.2, 275.3, 100, 275.4, 126
See application file for complete search history.

(56) References Cited

FOREIGN PATENT DOCUMENTS

| | | |
|---|---|---|
| JP | 63-122032 | 5/1988 |
| JP | 5-101454 | 4/1993 |
| JP | 11-185288 | 7/1999 |
| JP | 2002-184056 | 6/2002 |

OTHER PUBLICATIONS

"Electron-spin-resonance studies of pyrrole polymers: Evidence for bipolarons" by J.C. Scott, et al. Aug. 15, 1983. pp. 2140-2145.
"A New Polymer Network For Ionic conduction" by J.F. Le Nest, et al. pp. 1585-1588.

*Primary Examiner*—Nabil Z Hindi
(74) *Attorney, Agent, or Firm*—Antonelli, Terry, Stout & Kraus, LLP.

(57) ABSTRACT

The present invention relates to an information-recording medium for recording and reproducing information by using light and a method for recording information for the purpose of high-speed and high-density recording. The medium has a structural unit having a conductive polymer layer and an electrolyte layer sandwiched by a pair of electrode layers, each of which contains a thermally decomposable or crosslinkable compound. The medium described above allows high-speed rotation of the medium as it has a narrower range heated during recording and is more tolerant of displacement of auto-focusing or tracking, and also allows high-speed and high-density recording. The medium also allows lamination of multiple layers and easier selection of layers therein.

18 Claims, 21 Drawing Sheets

51

52

54

55

56

57

58

59

60 ized patent applications (U.S. Ser. No. 10/336,717 filed on Jan. 6, # INFORMATION-RECORDING MEDIUM AND METHOD

CROSS-REFERENCE TO RELATED APPLICATION

The present application claims priority from Japanese patent application No. JP 2003-347766 filed on Oct. 7, 2003, the content of which is hereby incorporated by reference into this application.

Further, the subject matter disclosed in this specification is related to those disclosed in the commonly assigned U.S. patent applications (U.S. Ser. No. 10/336,717 filed on Jan. 6, 2003; Ser. No. 10/817,863 filed on Apr. 6, 2004; and Ser. No. 10/763,274 filed on Jan. 26, 2004). The contents of the present application are incorporated herein by reference.

BACKGROUND OF THE INVENTION

The present invention relates to an information-recording medium and method for recording and reproducing information by using light.

In the present application, media for recording and reproducing information, such as optical disks, are called "information-recording media".

There are hitherto various optical disks such as DVD-RAM disks that use a phase-change film as an information-recording film, and CD-R and DVD-R disks that use organic materials as information layers. In the optical disks using organic materials as information layers, the information layer contains dyes absorbing a recording light, and so a substrate surface contacting with it is transformed by laser irradiation and information is recorded.

Conventionally, as disclosed in, for example, Japanese Patent Laid-open No. 63-122032, there has been known an electric field-effect optical disk in which information is recorded on a phase-change recording film by irradiation of a laser beam while an electric field is applied to the recording layer. These disks employ a device structure wherein a phase-change information layer containing, for example, GeSbTe etc. is sandwiched between upper and lower electrodes. This purpose is that phase change (crystallization) caused by laser-beam irradiation is further promoted by application of an electric field to the recording film.

Further, Japanese Patent Laid-open No. 5-101454 describes an optical information-recording medium in which a semiconductor film made from $WO_3$ having a photo-intercalating or photo-deintercalating effect and an electrolyte film are disposed so as to contact with each other and which becomes transparent since ions in the electrolyte film are taken in an optical semiconductor when light is irradiated.

SUMMARY OF THE INVENTION

However, in Japanese Patent Laid-open No. 5-101454 as described above, a liquid electrolyte higher in speed of response than a solid electrolyte is used as the electrolyte film. Additionally, studies by the present inventors have revealed the problem that it takes at least several tens of seconds for the intensity of cell-transmitted light to amount to 70% of the intensity of incident light, i.e., it is very slow.

Further, in Japanese Patent Laid-open No. 63-122032 as described above, there has been the problem that since the recording layer always absorbs light, the recording layers cannot be informed into a multilayer structure and so it is difficult to form the media having more recording capacity than that of one layer.

An object of the present invention is to provide an information-recording method and an information-recording media with high density and high speed.

Hereinafter, to solve the above problems, a structure of the present invention will be described.

The information-recording medium according to the present invention has, as a basic unit, a structure similar to the sectional structure shown in FIG. 1. The basic unit has a structure including: an electrochromic layer 1 containing conductive electrochromic polymer materials; an electrolyte layer 2 provided to be adjacent to the electrochromic layer 1 and having ions diffusible into the eleotrochromic layer 1 by application of a voltage; and a first electrode 3 and a second electrode 4 between which both sides of the electrochromic layer 1 and the electrolyte layer 2 are sandwiched. A voltage is applied to the electrodes 3 and 4 by a power source 5.

In this case, a conductive electrochromic polymer material is a material, which is a semiconductor-like conductive polymer and changes its color (absorption spectrum) reversibly by the application of voltage. Examples of the conductive electrochromic polymer materials include conjugated polymers having conjugated double or triple bonds, such as polyacetylene, polyanlline, polypyrrole, polythiophene, and the derivatives thereof. The electrochromism of these conductive electrochromic polymer materials is based on the following principle. The principle is explained with polythiophene as an example. FIG. 2 represents two electronic resonance structures of polythiophene in the ground state, and an aromatic structure 8 and a quinoid structure 9 can be used as the resource structure. Regarding the aromatic structure 8 and the quinoid structure 9, the aromatic structure 8 is lower in energy level and since the two structures are not equivalent in energy level, the ground state of polythiophene is not degenerated. Similarly thereto, the ground states of polyaniline, polypyrrole, polythiophene, and polyphenylene vinylene, etc. except polythiophene are also not degenerated and are non-degenerated conductive polymers. Electrochromism in non-degenerated conductive polymers is explained by the following polaron and bipolaron, as described in J. C. Scott et al., Physical Review B, 28, No. 4, pp. 2140-2145. FIG. 3 illustrates a change of a molecular structure associated with doping of polythiophene. When doped with an acceptor in a neutral state 12, polythiophene is oxidized by transfer of an electron oxidation (one-electron oxidation) 13 and enters into a one-electron oxidation state 14. Examples of the acceptors for use in doping include halogens such as $Br_2$, $I_2$, and $Cl_2$; Lewis acids such as $BF_3$, $PF_5$, $AsF_5$, $SbF_5$, $SO_3$, $BF_4^-$, $PF_6^-$, $AsF_6^-$, and $SbF_6^-$; protonic acids such as $HNO_3$, HCl, $H_2SO_4$, $HClO_4$, HF, and $CF_3SO_3H$; transition metal halides such as $FeCl_3$, $MOCl_3$, and $WCl_5$: and organic substances such as tetracyanoethylene (TCNE) and 7,7,8,8-tetracyanoquinodimethane (TCNQ). The one-electron oxidation state 14 enters via a relaxation process 15 into a positively charged polaron state 16. According to Dictionary of Science and Chemistry, 5th Ed., (1998, Iwanami Shoten), the "polaron state" means a state wherein conductive electrons in crystal are moving depending on deformation of the surrounding crystal lattice. In the polaron state in this case, the "crystal" may be replaced with a "neutral state of polythiophene molecule", and the "deformation of crystal lattice" is thought as "generation of a local quinoid structure in the polythiophene molecule by one-electron oxidation". When an additional acceptor is doped, polythiophene in the polaron state 16 is further oxidized to a positive bipolaron state 17. On the other hand, a negatively charged polaron and a bipolaron are generated in a reduction reaction 18 by doping with an electron donor. Examples of the donors for use in doping include alkali metals such as Li, Na, K, and Cs; and quaternary ammonium ions such as tetraethylammonium and tetrabutylammonium. The polaron and the bipolaron migrate on macromolecular strands and thus contribute to a current. In addition to the above-mentioned dopants, polymer electrolytes called polymer dopants may also be used. Examples thereof include polystyrenesulfonic acid, polyvinylsulfonic acid, and sulfonated polybutadiene. If polyaniline, polythiophene, or polypyrrole is polymerized in the presence of any one of these polymer electrolytes, the conductive polymer obtained is an ion complex with the polymer electrolyte used. Use of a polymer dopant is effective in improving processability, for example, in making an insoluble conductive polymer more soluble in solvents.

The relationship among the polaron and bipolaron and the electrochromism is explained with reference to FIG. 4 that illustrates a band structure showing the electronic states of a non-degenerated conductive polymer. In this case, a change of an electronic state associated with doping with an acceptor is illustrated. In the band structure 21 in a neutral state without doping, there is a difference in electronic energy 25 called forbidden band width 24 between the highest energy of a valence band 22 and the lowest energy of a conduction band 23, and the polymer absorbs light having energy corresponding to the forbidden band width 24 as allowed transition 26. If the wavelength of the absorbed light is within a wavelength region of visible light, the polymer becomes colored. The forbidden bandwidths 24 of non-degenerated conductive polymers are generally 0.1 to 3 eV similarly to those of inorganic semiconductors. In the band structure 27 of the positive polaron state generated as a result of acceptor doping, there are two polaron levels, polaron level $P^+$ 28 and polaron level $P^-$ 29, generated between the valence band 22 and the conduction band 23. The allowed transition 30 in the polaron state is different In transition energy width and transition probability from the allowed transition 26 in the neutral state, and so a light-absorbing property is changed and the change in the visible light region is observed as a change in color. In a band structure 31 of the bipolaron state, which is further oxidized by additional doping, there are two bipolaron levels, bipolaron level $BP^+$ 32 and bipolaron level $BP^-$ 33, newly generated between the valence band 22 and the conduction band 23. Accordingly, as the allowed transition 34 in the bipolaron state is further changed, a light-absorbing property is also changed. By doping a non-degenerated conductive polymer with an electron donor, a change in the patterns of allowed transition due to the change in band structures associated with generation of the polaron and bipolaron levels can be observed as electrochromism in a similar manner.

The band structure of the non-degenerated conductive polymer is completely different from the band structure of inorganic semiconductors represented by silicon materials. FIG. 5 shows a band structure of the electronic states of an inorganic semiconductor crystal in the neighborhood of the lattice constant, and the upper area In FIG. 5 is higher in electronic energy 40. The area between the lowest level of a conduction band 41 and the highest level of a valence band 42 is a forbidden band 43, and the energy gap thereof is forbidden band width 44.

For example, In an N-type semiconductor wherein silicon crystal is doped with a Group V atom such as P, As, or Sb, one of the outermost shell electrons of the Group V atom is located at the donor level 45 immediately below the conduction band 41. Because the energy gap between the lowest level of a conduction band 46 and the donor level 45 is smaller, an electron at the donor level 45 easily moves into the conduction band 41, and when an electric field is applied to the electron, the electron moves in the positive potential direction, whereby a current flows.

On the other hand, in a P-type semiconductor in which silicon crystal is doped with boron (B) belonging to a Group III atom, the boron atom is replaced with the silicon atoms in semiconductors, whereby an acceptor level 47 is formed at an energy level immediately above the valence band 42. Electrons present in the valence band 42 are easily captured by the acceptor level, positive holes in the valence band 42, from which the electrons are removed, move freely in the valence band 42 and are observed as a current.

Tungsten oxide, which is a typical inorganic electrochromic material and has the properties of an inorganic semiconductor, changes its color from colorless (or pale yellow) to dense blue reversibly, by intercalation of protons or alkali metal ions such as lithium ion into the crystal lattice depending on application of voltage. The electrochromism of this tungsten oxide is caused by absorbing the inter-valence transition in the mixed-valence state in which haxavalent tungsten atoms are partially reduced to pentavalent atoms, and this can be explained by FIG. 6. Reference numeral "240" denotes energy of the electron. The conduction band of tungsten oxide is formed by a fifth orbit of tungsten atom. In the mixed-valence state, the inter-valence transition 243 from the energy level 241 of tungsten atom (pentavalent) to the energy level 242 of tungsten atom (hexavalent) occurs, whereby coloring is performed due to the transition. The electrochromism of molybdenum oxide, iridium oxide, manganese dioxide, nickel oxide, Prussian blue (iron cyano complex in a mixed atomic valence state of bivalent and trivalent irons), or the like is also based on the same principle. As described above, the electrochromism of inorganic electrochromic materials is caused by intercalation of ions into crystal lattices, so that both of a coloring speed and a fading speed are very slow and it usually takes one minute or more to switch from a colored state to a colorless state or vice versus.

Because the electrochromic characteristics associated with doping of non-degenerated conductive polymers are used for recording in the present invention, non-degenerated conductive polymers exhibiting electrochromism will be referred to hereinafter as "conductive electrochromic polymer materials".

(Electrolyte Layer)

The electrolyte layer, which is provided next to the information layer containing a conductive electrochromic polymer material and has ions diffusing into the information layer by the application of voltage, contains at least a polymer material serving as ions and a support for diffusing into the conductive electrochromic polymer material.

The ion to be diffused for coloration of the conductive electrochromic polymer material is typically a lithium ion. This is because lithium ion, which has a smaller ionic radius, is faster in movement by the application of voltage and thus superior in coloring efficiency and coloring-responding speed to, for example, sodium or calcium ion. Lithium ion is also advantageous in that it seldom produces very insoluble salt and it suppresses deterioration. The sources of lithium ion include lithium perchlorate ($LiClO_4$), lithium triflate ($CF_3SO_3Li$), lithium iodide (LiI), lithium hexafluorophosphate ($LiPF_6$), and lithium tetrafluoroborate ($LiBF_4$), and lithium trifluoromethanesulfonimide (LiTPSI), etc.

The polymer material serving as the support is preferably very transparent and very miscible with the above lithium salt, and has a high ionic conductivity as it is. Such polymer materials include polymethyl methacrylate (PMMA), polyacrylamide (PAD), polyvinyl butyral (PVB), polystyrene (PSt), polyethylene oxide (PEO), and the like. The number-average molecular weight thereof is preferably 1,000 or more. Among them, PEOR of which oxygen atom in a polymer main chain has an unpaired electron pair, is superior in affinity with highly electropositive lithium ions and exhibits higher ionic conductivity. This is because lithium ions move so as to hop on the oxygen atoms in the PEO main chain when a voltage is applied. A copolymer of ethylene oxide and propylene oxide has been reported to have high ionic conductivity (up to approximately 1E-4 [S/cm] at most) by J. F. Le Nest et al., in Electrochimica Acta, Vol. 37, p. 1585, (1992).

A polymer material having higher ionic conductivity includes polymer called "polyalkylene carbonate" (PAC) 301 shown in FIG. 7. In FIG. 7, reference numeral "302" denotes a polymerization degree "n" having an integer of 1 to 100,000, and "303" denotes a hydrogen atom or an alkyl group having 1 to 10 carbons. Typical examples thereof include polyethylene carbonate (PEC) 305 and polypropylene carbonate (PPC) 304. The PAC easily forms a complex with lithium ions as it contains carbonate-derived oxygen atom in the polymer main chain. In a similar manner to PEO, since lithium ions easily move on the carbonate-derived oxygen atoms of PAC, and provide PAC with high ionic conductivity. PAC is thermally decomposable, and PEC decomposes at 230° C. or more as shown in the thermogravimetric curve 306 of FIG. 8. The decomposition reaction is expressed by reaction formula 310, and PEO produces a low-molecular weight carbonate compound under the condition in which a content of oxygen is small.

Hereinafter, a method for optical recording and reproducing information when the information layer is a single layer will be described with reference to FIG. 1. When an electrochromic layer 1 containing a conductive electrochromic polymer material is provided next to an electrolyte layer 2, ions contained in the electrolyte layer 2 diffuse into the electrochromic layer 1 if a voltage is applied by using a power source 5 between the first electrode 3 and the second electrode 4 that is folding the electrochromic layer 1 and electrolyte layer 2. The diffusion of the ions of the electrolyte layer 2 into the electrochromic layer 1 will be referred to hereinafter as doping. As the light-absorbing property of the electrochromic layer 1, i.e., color, can be changed reversibly by voltage control, the colored state (absorbing the recording light 6) and the non-colored state (not absorbing the light) can be selected freely. In the state of absorbing the recording light 6, irradiation of the light 6 results in thermal recoding, i.e., recording by the heat generated in the irradiated region, and thus suppresses electrochromism. The above suppression of electrochromism means that a material that can be present originally both in colored and non-colored states becomes no more colored. The application of voltage for coloring the information layer during recording is defined as application of a particular voltage that provides a difference between the pre-recording and post-recorded light transmissions of 10% or more, which is calculated by subtracting the light transmission (%) of the pre-recording information layer in the colored state from the post-recorded light transmission (%) of the information layer. Irradiation of the recording light 6 may be performed from the reverse face, in other words, from the face of electrolyte layer 2. Note that the information recording is performed either by laser irradiation or laser heating.

The region once recorded cannot be colored any more even under a condition where the region not recorded can be colored. Accordingly, as the recorded region is not colored by application of voltage between the first electrode 3 and second electrode 4, by using the power source 5 under the same condition as that the electrochromic layer I is recorded before recording, information reproduction is performed by detection of the transmittance and the reflectance of reproducing light 6. The reproduction should be performed at the light intensity that may not cause suppression of electrochromism, and thus the intensity of the reproducing light is 30% or less with respect to that of the recording light. The voltage between the first electrode 3 and the second electrode 4 required for recording and reproduction is 3 to 10 V, when the first electrode 3 is set to positive.

The mechanism of recording is in the heat mode, which may be carried out by changing the electric resistance of the electrolyte layer. In the present invention, recording is performed while changing the resistance (conductivity) of the electrolyte layer. In the present application, changing resistance (conductivity) is defined as changing the resistance (conductivity) of the areas irradiated and not irradiated with energy in such a manner that the difference between them becomes 20% or more. By this mechanism, recording may be performed without causing a chemical change in the electrode layer or the electrochromic layer. Methods of changing the resistance of electrolyte layer by the thermal energy generated by light absorption of the electrochromic layer include the following method by using:

(a) a thermally decomposable ionic conduction polymer electrolyte; and (b) a thermally crosslinkable ionic conduction polymer, an oligomer, or a low-molecular weight monomer.

Specifically, the former method (a) employs a compound such as PAC of which the polymer main chain decomposes by heating and a lithium salt as the source of lithium ions. PEC and PPC, both of which are PAC polymers, decompose thermally at 240° C. or more, and compounds generated in the minute areas heated are smaller in molecular weight and diffuse uniformly into the electrolyte layer within several minutes. After diffusion, the conductivity of the heated minute area is different by 50% or more from that of the other areas. In addition to the PAC polymers, other polymers compatible therewith and thermally more stable than PAC, for example, PMMA and others may be used. The weight composition ratio of PMMA to PAC is in the range of 0:100 to 90:10. FIG. 9 shows a result of thermogravimetric analysis of PMMA, indicating that PMMA does not exhibit any change such as decomposition at 240° C. In a ternary system consisting of PEC, PMMA and a lithium salt (e.g., $CF_3SO_3Li$, $LiPF_6$, or the like), when light is irradiated for recording information onto an electrolyte layer formed next to an electrochromic layer in the colored state so that the temperature thereof becomes 240° C. or more, PEC decomposes thermally while PMMA does not. As the conductivity of PMMA is far lower than that of PEC (1E-8 S/cm), after diffusion of the thermal decomposition products of PEC into the electrolyte layer, a light-irradiated area has a conductivity lower by 50% or more than that of the non-light-irradiated area and becomes more resistant to coloring. It is possible to perform information reproduction with weaker light that does not heat the electrochromic layer to a temperature of 240° C. or more. The method allows particularly high-sensitivity recording when the electrolyte is completely a solid electrolyte.

In the latter method (b), recording is performed, as the heat generated by light absorption of the electrochromic layer diffuses into the neighboring electrolyte layer, causing local crosslinking and polymerization reactions and reducing the conductivity by 50% or more. In such a case, the electrolyte layer is selected from several possible compositions. Two typical examples thereof are: (c) an electrolyte layer containing a polymer having a cross-linkable (polymerizable) functional group and a lithium salt; and (d) an electrolyte layer containing a polymer having no thermally crosslinkable (polymerizable) functional group in its molecule, a cross-linkable (polymerizable) low-molecular weight monomer, and a lithium salt.

The above crosslinking or polymerization reactions include: polymerization reactions of a vinyl, acryl, or methacryl group by radical or cationic polymerization; crosslinking reactions of an epoxy group; and the like. The radical polymerization is higher in polymerization rate and thus most favorable. For example, use of an organic peroxide that decomposes at 150° C. or more and generates radicals accelerates the polymerization reaction and allows higher-density and higher-sensitivity recording of information. Specific examples of the peroxides include benzoyl peroxide, p-chlorobenzoyl peroxide, acetyl peroxide, 2,5-dimethylhexyl-2,5-dihydorperoxide, di-tert-butyl peroxide, 2,5-dimethylhexyl-2,5-di(peroxybenzoate), tert-butyl peracetate, di-tert-butyl diperphthalate, and the like. These organic peroxides are used in an amount in the range of 0.01% to 10% with respect to the total amount of the polymers and the monomers. Typical examples of the cross-linkable (polymerizable) low-molecular weight monomers include vinyl compounds, acrylic compounds, methacrylic compounds, and epoxy compounds, depending on the kind of reactive group. Examples of the vinyl compounds include styrene derivatives such as styrene and α-ohlorostyrene and divinylbenzene. Examples of the acrylic compounds include acrylic acid, 2-ethylhexyl acrylate, n-stearyl acrylate, lauryl acrylate, 2-hydroxypropyl diacrylate, 2-hydroxyethyl acrylate, diethylene glycol diacrylate, triethylene glycol diacrylate, tetraethylene glycol diacrylate, pentaerythritol triacrylate, trimethylolpropane triacrylate, tetramethylolmethane tetraacrylate, and N,N'-methylene bisacrylamide.

Examples of the methacrylic compounds include methacrylic acid, methyl methacrylate, ethyl methacrylate, n-butyl methacrylate, 2-ethylhexyl methacrylate, lauryl methacrylate, 2-hydroxyethyl methacrylate, 2-hydroxypropyl methacrylate, allyl methacrylate, glycidyl methacrylate, dimethylaminoethyl methacrylate, ethylene glycol dimethaorylate, diethylene glycol dimethacrylate, triethylene glycol dimethacrylate, polyethylene glycol #200 dimethacrylate, polyethylene glycol #400 dimethacrylate, polyethylene glycol #600 dimethacrylate, trimethylolpropane trimethacrylate, trimethylolethane trimethacrylate, and 2,2-bis(4-methacryloxypolyethoxyphenyl)propane. Examples of the epoxy compounds include ethylene glycol diglycidylether, propylene glycol diglycidylether, glycerol polyglycidylether, diglycerol polyglycidylether, allyl glycidylether, polyethylene glycol diglycidylether, tripropylene glycol diglycidylether, glycerin polyglycidylether, trimethylolpropane polyglycidylether, multifunctional glycidylethers, epoxy acrylate, butylglycidylether acrylate, ethylene glycol diglycidylether, and spiro-glycol diglycidylether. These cross-linkable (polymerizable) low-molecular weight monomers are used in an amount in the range of 0.1 to 70 wt % in the composition.

(Effects of Crosslinkable Materials by Group)

These acrylic and methacrylic compounds can be classified into monofunctional, bifunctional, trifunctional, and tetrafunctional compounds by the number of acryl or methacryl groups in a molecule. The crosslinking efficiency is higher in the compounds having a greater number of functional groups, i.e., the efficiency of a trifunctional compound is higher than that of a bifunctional compound, which in turn higher than that of a monofunctional compound, and thus the recording density and sensitivity are likely to be higher in that order. Among acrylic compounds, triacrylates and tetraacrylates are preferably, while among methacrylic compounds, trimethacrylates and tetramethacrylates are favorable in recording characteristics. In a similar manner, among epoxy compounds, bifunctional, trifunctional or further multifunctional compounds are superior.

Examples of the conductive electrochromic polymer materials for use in the electrochromic layer include conductive polymers such as polythiophene 51, polypyrrole 52, polyaniline 54, poly(3,4-ethylenedioxythiophene) 55, poly(3,4-ethylenedioxypyrrole) 56, poly(3,4-ethylenedimethoxythiophene) 57, poly(3,4-butylenedioxythiophene) 58, poly(3,4-dimethyl-3,4-dihydro-2H-thieno-[3,4-b]-[1,4]-dioxepine) 59, and alkylated derivatives of poly(3,4-ethylenedioxythiophene) 60 shown in FIG. 10, as well as the ion complexes thereof with polystyrenesulfonic acid, polyvinylsulfonic acid, or the like. In other words, the conductive electrochromic polymer material contains at least one compound selected from the groups consisting of polythiophene and the derivatives thereof, polypyrrole and the derivatives thereof, and polyaniline and the derivatives thereof. In FIG. 10, the term "n" is an integer; and "$R_1$," "$R_2$," "$R_3$," "$R_4$" and "$R_5$" each represent a hydrogen atom or an alkyl group, an alkylether group, a carboxyl group, or the like. In polythiophene 51 and polypyrrole 52, if the substituent groups R are the groups selected from the alkyl groups such as butyl, hexyl, octyl, and decyl groups, the compound is more soluble in an organic solvent and more suitable for forming an electrochromic layer by casting or spin coating, In addition, ion complexes between the above conductive polymers and polystyrenesulfonic acid are water-soluble and thus suited for forming an information layer by casting or spin coating.

(Effects of Conductive Electrochromic Polymer Materials)

Among the above conductive electrochromic polymer materials, polyaniline 54 and polythiophenes are more stable than polypyrrole 52. Polythiophenes are superior to polyaniline 54, as they have a greater contrast during coloring and fading, and in particular, are superior in transparency during the fading. Among polythiophenes, poly(3,4-ethylenedioxythiophene) 55, poly(3,4-butylenedioxythiophene) 58, poly(3,4-dimethyl-3,4-dihydro-2H-thieno-[3,4-b]-[1,4]-dioxepine) 59, and the alkylated derivatives of poly(3,4-ethylenedioxythiophene) 60 are particularly chemically stable and have a greater contrast between the colored and non-colored states, and thus preferable. The electrochromic layer may be formed by casting or spin coating a solution of the conductive electrochromic polymer material in water or an organic solvent, vapor deposition, or electric-field polymerization on an electrode by using the monomer. The information layer may be coated over the electrolyte layer formed on an electrode, by spin coating, vapor deposition, or the like. The electrochromic layer preferably has a light transmission of 90% or more in the non-colored state and a light transmission of 60% or less in the colored state. The thickness of the information layer is favorably 100 nm or less.

Note that although the conductivity of both acrylic compounds in items (a) and (b) is so far described to decrease as heat is applied, the compounds may be so designed that the conductivity thereof increases in principle by heating.

A liquid electrolyte, a gel electrolyte or a solid electrolyte may be used as the electrolyte layer. However, the liquid and gel electrolytes have higher conductivity but are poorer in mechanical strength, inevitably each demanding a spacer or a sealing mechanism. For the reason, it is difficult to produce thinner films, raising production cost. Thus, the solid electrolyte is more preferably. Use of a liquid or gel electrolyte provides a merit of increase in the speed of response. The solid electrolyte contains a supporting medium, i,e., an ionic conduction polymer and a dopant for the information layer, i.e., an electrolyte salt. The ionic conduction polymers for use include poly(methyl methacrylate), polyethylene oxide, polypropylene oxide,.copolymers of ethylene oxide and epichlorohydrin, polycarbonate, polysiloxane, and the like, Examples of the electrolyte salts include lithium perchlorate ($LiClO_4$), lithium triflate ($LiCF_3SO_3$), lithium hexafluorophosphate (LiPF), lithium tetrafluoroborate ($LiBF_4$), N-lithio-trifluoromethanesulfonimide [$LiN(SO_3CF_3)_2$], and the like. A plasticizer such as propylene carbonate, ethylene carbonate, or the like and a surfactant may be also added for improvement in the ionic conductivity of electrolyte layer.

The electrolyte layer is formed by coating a solution of an ionic conduction polymer and an electrolyte salt in an organic solvent such as acetone, acetonitrile, 2-propanol, diethylene glycol dimethylether, methylethylketone, cyclohexanone, or the like by spin coating or the like on an electrode or an information layer, and evaporating the solvent. The thickness of the electrolyte layer is preferably in the range of 10 to 100 nm.

Metal oxides such as ITO (indium tin oxide), indium oxide ($In_2O_3$), tin oxide ($SnO_2$), and IZO (indium zinc oxide), and metals such as aluminum, gold, silver, copper, palladium, chromium, platinum, and rhodium are used as the electrode layers folding the electrochromic layer and the neighboring electrolyte layer. The electrode layer closer to the incident recording and reproducing light should have a higher light transmission and preferably has a light transmission of 85% or more. Methods of forming the electrochromic layer include RF sputtering, reactive sputtering, CVD (chemical vapor deposition), ion plating, vacuum deposition, and oxidation treatment.

The information-recording medium according to the present invention is suitable for use in the form of optical disk such as CD-R or DVD-R, by providing the information-reproducing device with a mechanism of supplying electric current to the electrochromic layer. FIG. 11 illustrates a structure of the medium. In the FIG. 11, light enters from the top. The medium has, from the incident light side 101, a substrate 98, a protective layer 91, a first electrode layer 92 (transparent electrode), an electrolyte layer 93, an electrochromic layer 94, a second electrode layer 95, a ultraviolet-cured resin film 96, and a bonding protective substrate 97; and reference numeral "99" corresponds to a land area and "100" a groove area.

In the present invention, the areas of trench or dent on the substrate 98 are called "grooves". The area between a groove and another groove is called a "land". When light enters via the substrate 98 into the film, the groove appears as a bank. In so-called in-groove recording wherein recording is performed either on the land or the groove, it is more effective in-recording efficiency to record on the land for the incident light, either when the light enters from the substrate side or from the reverse side of the substrate, but the difference is not so large and thus the recording may be performed in the groove.

At least one of the first and second electrodes is preferably divided into multiple electrodes. If divided into multiple electrodes arranged in a radial pattern the electrodes are more compatible with CAV (constant angular velocity) recording and ZCAV (zoned CAV) recording, as it becomes possible to reduce the interelectrode capacity and thus increase the speed of response.

The information-recording medium according to the present invention is suitable for the multi-layer recording for the purpose of improving the recording density. Lamination of the above structural units into a multi-layer structure allows increase in the recording density and in the capacity of the medium. Although it is desirable to laminate for increasing the effective recording density (effective areal density) in the conventional media as well, the transmittance and the recording sensitivity of each layer are in the trade-off relationship in a laminate of three layers or more, inevitably impairing either reproduced signal quality or recording sensitivity. Although there are some transparent organic materials which allow three-dimensional recording including recording in the thickness direction, these materials are extremely lower in recording sensitivity as they employ two-electron absorption. However, as a particular information layer absorbs light only during recording and reproduction in the present invention, the other information layers do not impair recording or reproduction of Information. There is no need for spacer layers, which are required in the conventional multi-layered DVD disks wherein a layer is selected by changing the focal point of the recording or reading laser beam, and thus it is possible to place a large number of layers in the focal depth of lens, allowing the media to have a greater number of layers and thus a greater capacity than the conventional multi-layered disks. Information layers outside the focal depth may be accessed by varying the focal points for recording and reproduction. In such a case, multi-layer lamination sometimes leads to change of the bits corresponding to address information and deformation of grooves, and thus it is necessary to make the address of at least part of the layers readable in the focal depth of the changed focal position, for example, by placing additionally a layer whereon the bits and grooves are transferred as an intermediate layer in some cases.

When recording is performed by using the information-recording medium according to the present invention as an optical disk, it becomes possible to record at a recording laser power of 0.2 mW or more and 2 mW or less even under the condition of a recording linear velocity of 15 m/s or more. By raising the sensitivity in this manner, it also becomes possible to raise a transfer rate without shortage in power, during high-linear velocity recording, or when array lasers or a surface emitting laser is used as the means for irradiating light onto a plurality of areas on the information-recording medium simultaneously. It may also be possible to apply voltage simultaneously to at least two pairs of electrodes among a plurality of electrode pairs in the information-recording medium. It is especially required when a material demands application of a low maintaining voltage for prevention of discoloration.

When an Information-recording medium having a plurality of information layers is used, a voltage may be applied to a large number of electrode pairs therein, but it is possible to apply a particular voltage, which is different from the voltage applied to other electrode pairs, only to the electrode pair at both ends of the layer for recording or reading during recording or reading.

Alternatively, when light irradiation is to be switched from an information layer to another during recording or reading, the laser irradiation for recording or reading is once stopped and the voltage applied to the electrodes is changed, and in this manner, the layer so far recorded or read is decolorized and the layer to be newly recorded or read is colorized.

Only when the recording or reading laser moves from the front side to the back side as seen from the incident direction, it is allowed to start coloration of the back layer before completion of recording or reproduction and decolorization of the front layer, for shortening the standby time for switching the layers and thus for accelerating the process.

The device has a plurality of electrodes on the rotating shaft of a disk-rotating motor or at the areas where a disk-bearing part connected to the rotating shaft becomes in contact with the disk central hole, a means of positioning the disk so that the electrodes on the central hole area of a disk is properly connected to respective particular electrodes of the device when the disk is placed, and a means for connecting the rotating-shaft electrodes to the disk electrodes. In this manner, a voltage can be applied to each electrode.

Further, the information recording device has a projection tapered in the vertical direction on the rotating shaft of the disk-rotating motor having multiple divided electrodes at the height of the disk to be placed or at least one position in the circumferential direction of the side face of the disk-bearing part connected to the rotating shaft. This configuration allows correct positioning of the disk in the rotational direction and correct supply of electricity to the multi-layered electrodes.

The present invention is advantageous for the devices each having a recording density (track pitch, bit pitch) compatible with the specification for 2.6-GB DVD-RAM disks or more, and particularly advantageous for the devices each having a recording density compatible with the specification for 4.7-GB DVD-RAM disks or more. When the wavelength of light source is not around 660 nm, or when the numerical aperture (NA) of condenser lens is not 0.6, the present invention exerts an advantageous effect at a particular recording density or more both in the radius and circumferential directions, which is calculated by using the wavelength ratio and the NA ratio, and is also effective when a blue violet laser having an emission wavelength of approximately 410 nm is used.

After a study on background art, there have been found two relevant patent applications, Japanese Patent Laid-open No. 11-185288 and No. 2002-184056.

Japanese Patent Laid-open No. 11-185288 describes a medium having an electrochromic layer. The electrochromic layer consists of a colored layer of a substance that causes an electrochemical reaction, and an electrolyte layer containing electrolytes that mediates the electrochemical reaction. The irradiated light is reflected by the colored electrochromic layer. However, Japanese Patent Laid-open No. 11-185288 does not describe specifically which material is used as an electrochromic layer, and the electrochromic layer is used as a reflection layer, and thus the application is apparently different from the present invention.

Alternatively, Japanese Patent Laid-open No. 2002-184056 describes a method of using electrochromism that occurs only at the area between a recording head having an electrode and a recording layer or an electrode layer on the medium. The Japanese Patent Laid-open No. 2002-184056 uses a Prussian blue film as a recording layer, and thus is different from the present invention that uses a conductive electrochromic polymer material. Yet alternatively, Japanese Patent Laid-open No. 2002-184056 describes a method of recording by bringing a recording head having an electrode on the surface into contact with a recording layer formed on an electrode layer, which is different from the present application. The method does not allow construction of a multi-layered structure.

The medium as described above allows high-speed rotation of the medium as it has a narrower range heated during recording and is more tolerant of displacement of autofocusing or tracking, and also allows high-speed and high-density recording. The medium also allows lamination of multiple layers and easier selection of layers therein.

DESCRIPTION OF THE PREFERRED EMBODIMENTS

EXAMPLE 1

(Structure and Manufacturing Method)

Figure 1:
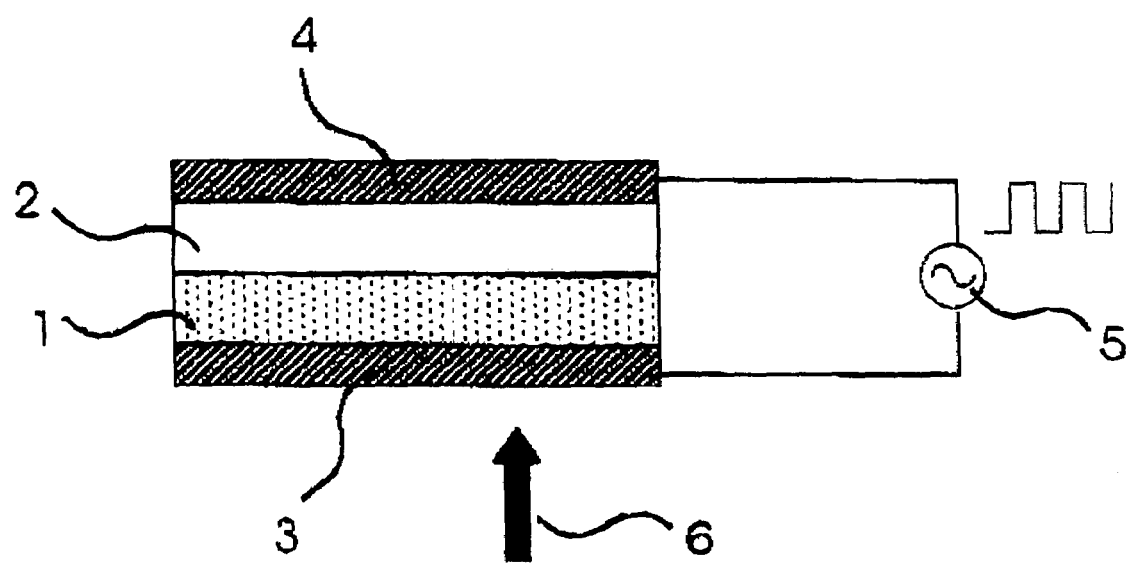
FIG. 1 is a view illustrating a structure of an information-storage medium according to the present invention.
Figure 2:
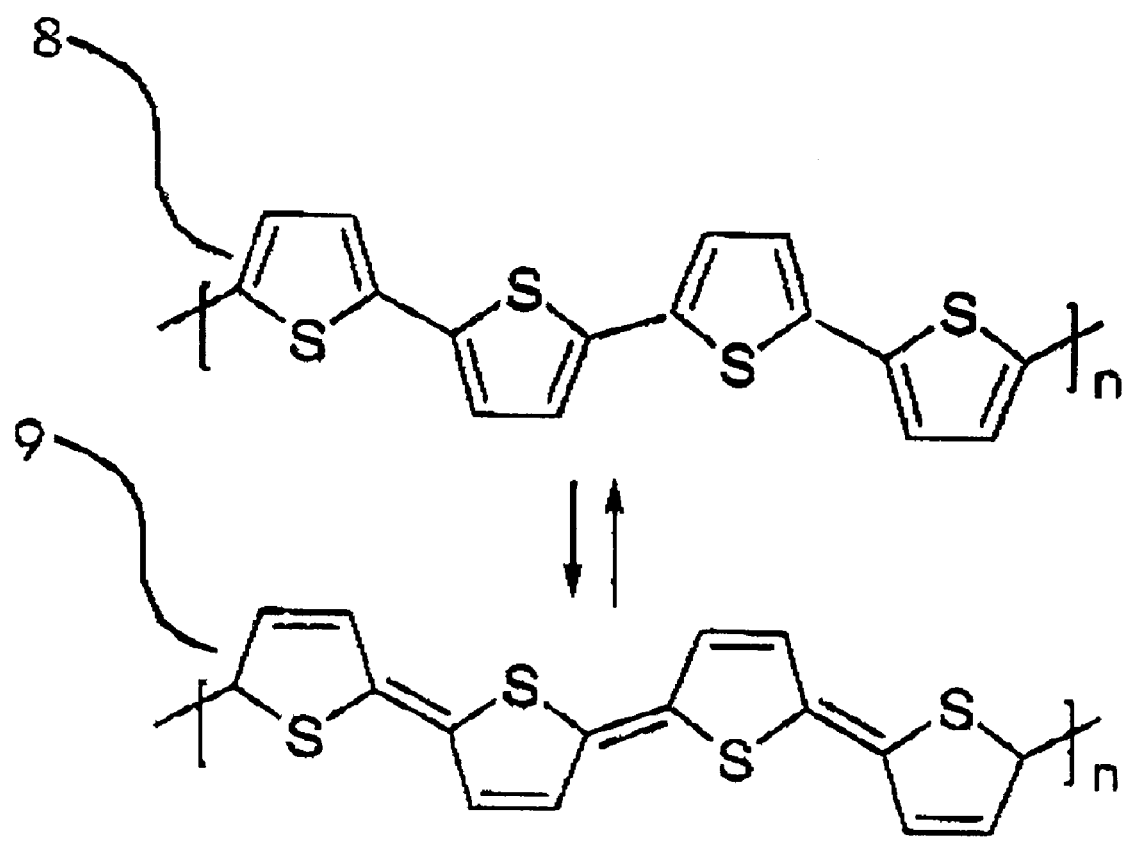
FIG. 2 is a view for describing a resonance structure of polythiophene which is a conductive electrochromic polymer material for use in the information layer of an information-storage medium according to the present invention.
Figure 3:
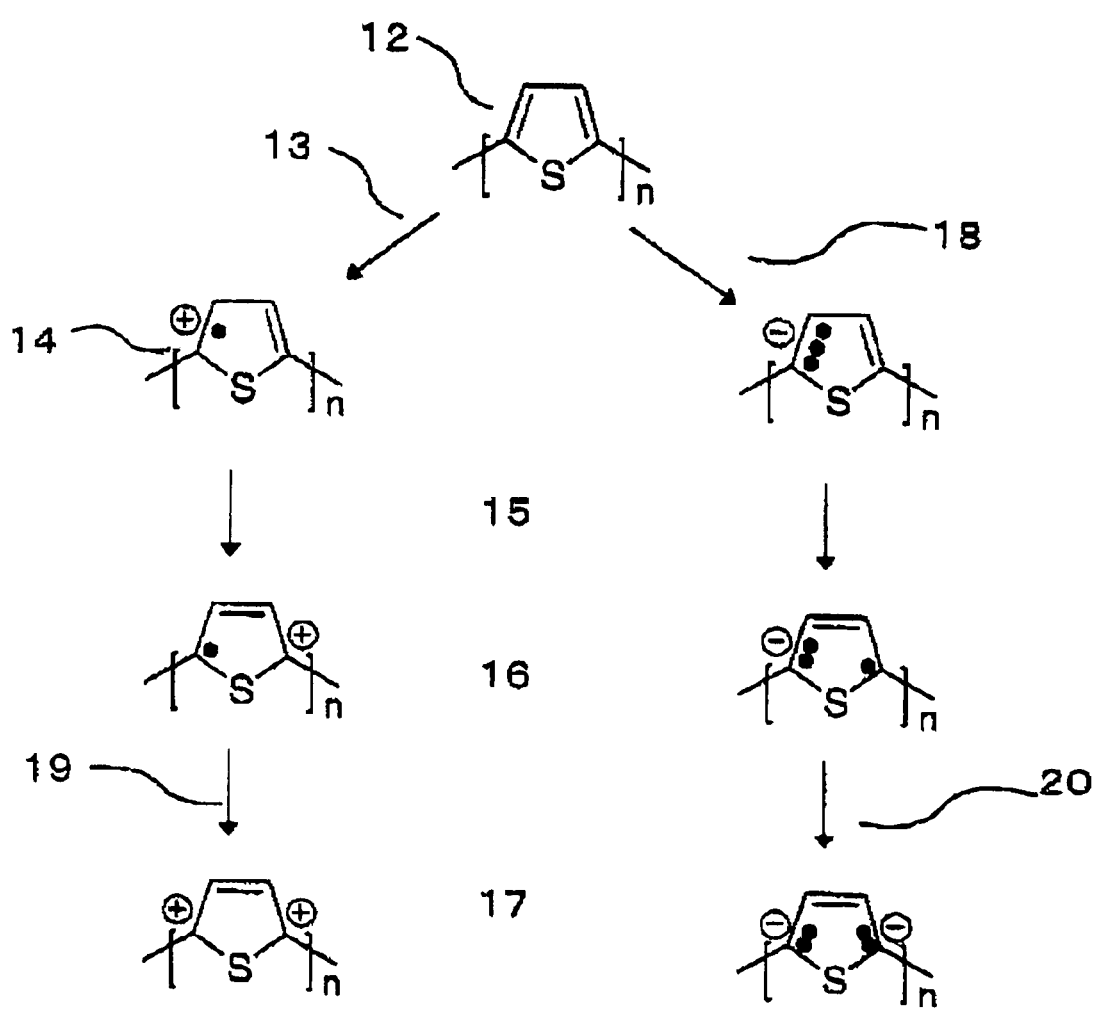
FIG. 3 is a chart illustrating a change in a molecular structure at a time of doping with polythiophene.
Figure 4:
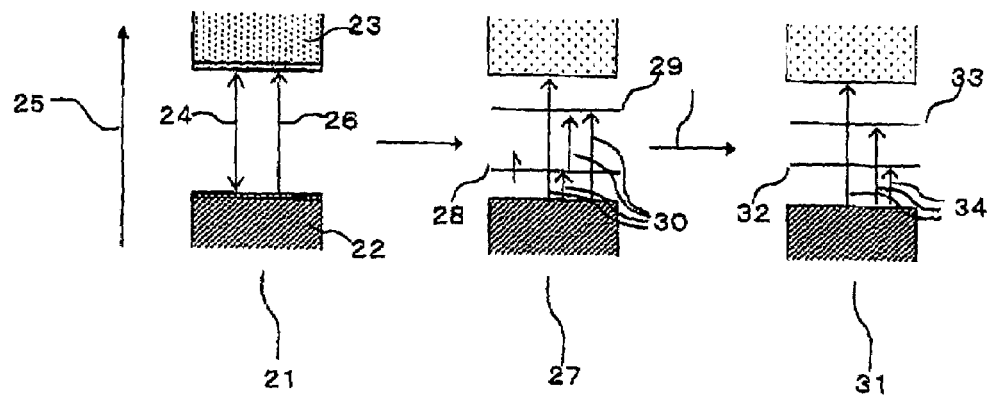
FIG. 4 is a view showing, in terms of band structures, electronic states of a non-degenerated conductive polymer.
Figure 5:
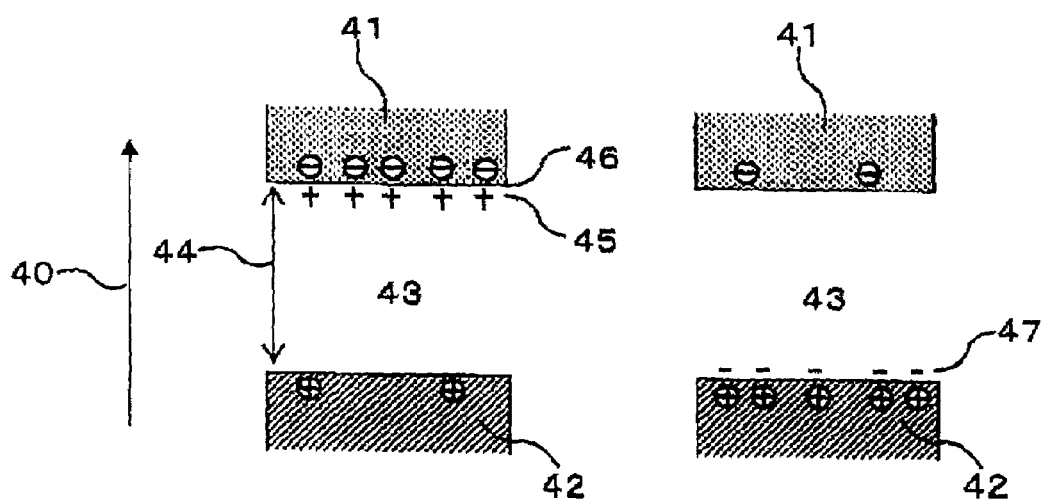
FIG. 5 is a view showing, in terms of band structures, electronic states of an inorganic semiconductor.
Figure 6:
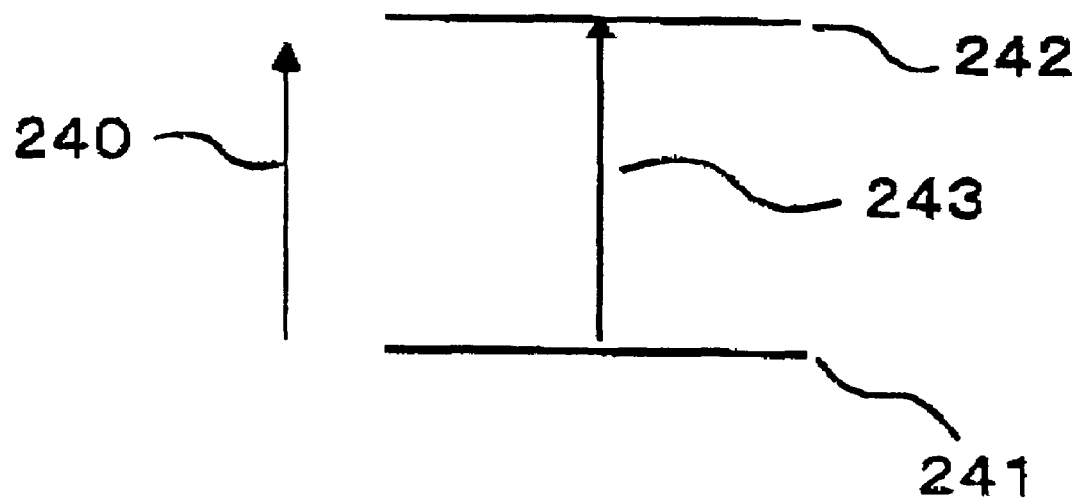
FIG. 6 is a view illustrating electronic states of a conduction band of tungsten oxide in a mixed atomic valence state.
Figure 7:
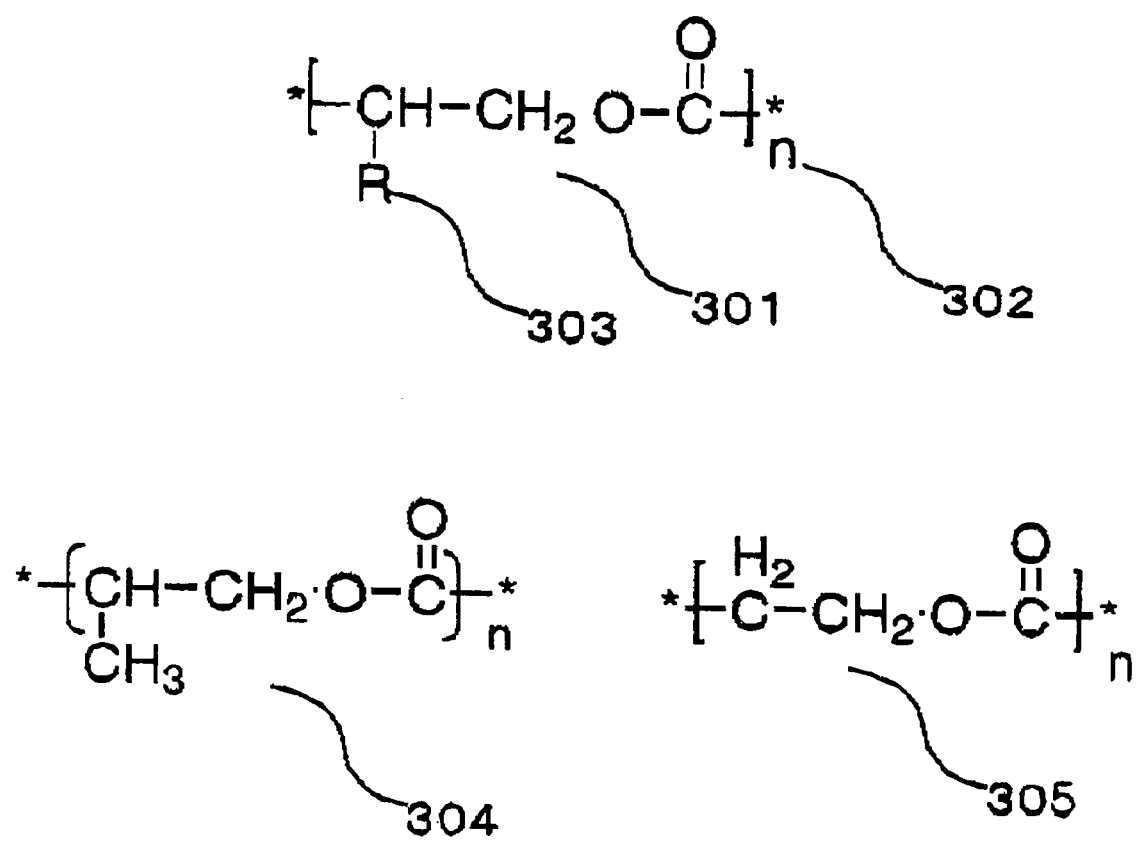
FIG. 7 is a view illustrating each molecular structure of PAC polymer, PPC and PEC.
Figure 8:
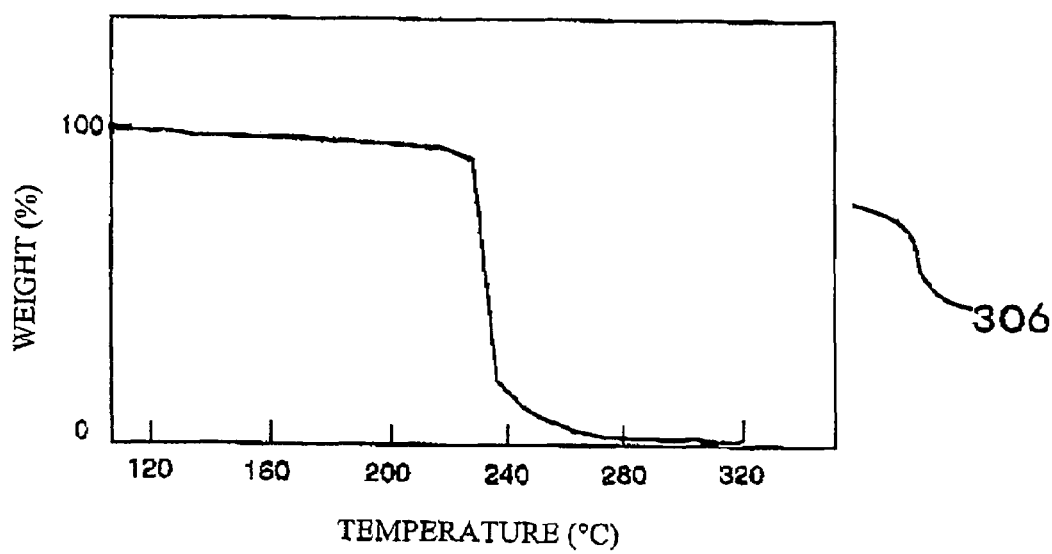
FIG. 8 is a view of a thermogravimetric curve of PEC and a formula of thermal decomposition reaction.
Figure 8:
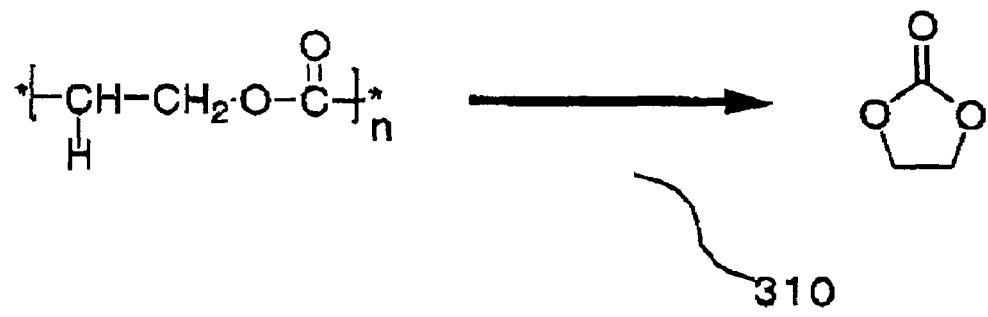
Figure 9:
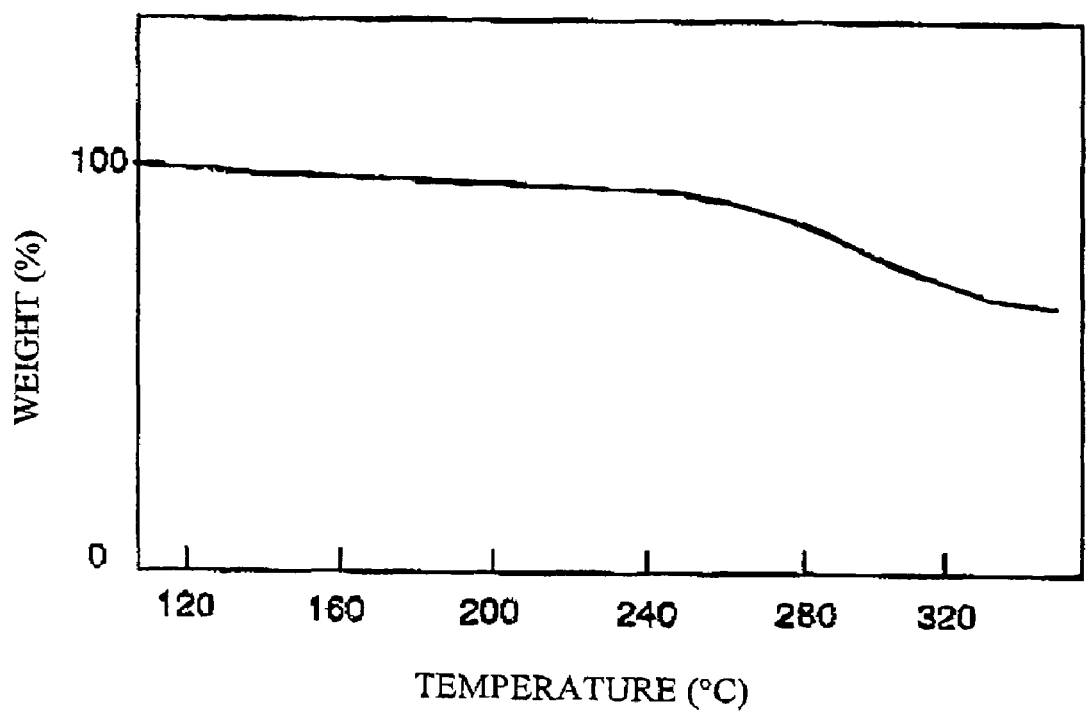
FIG. 9 is a view of a thermogravimetric curve of PMMA.
Figure 10:
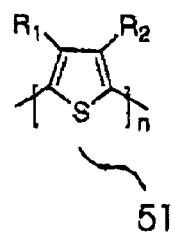
FIG. 10 is a list of structures of electrochromic compounds for use in electrochromic layer.
Figure 10:
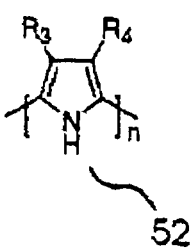
Figure 10:
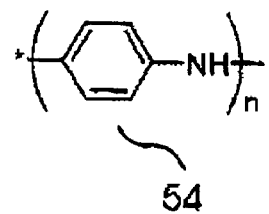
Figure 10:
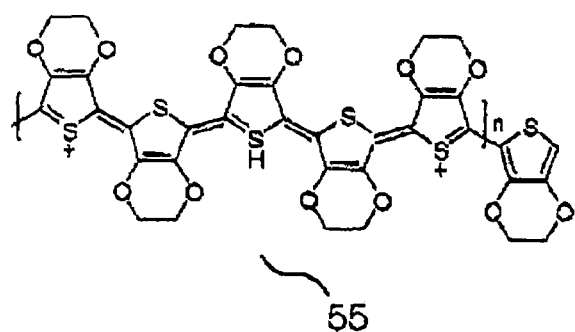
Figure 10:
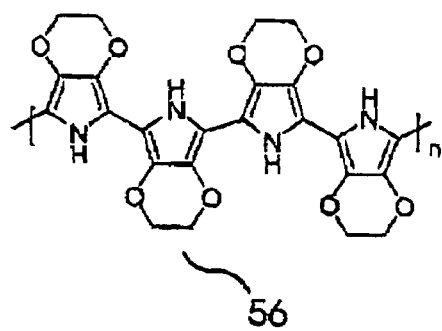
Figure 10:
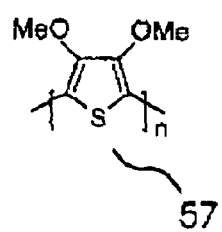
Figure 10:
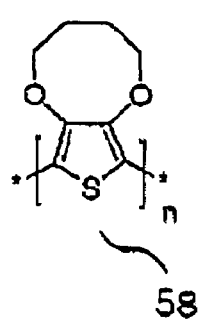
Figure 10:
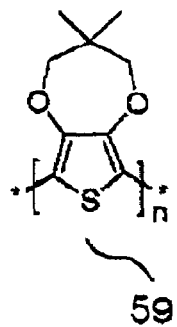
Figure 10:
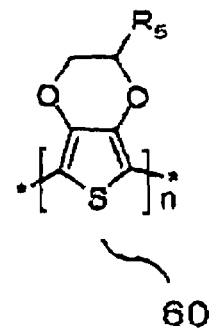
Figure 11:
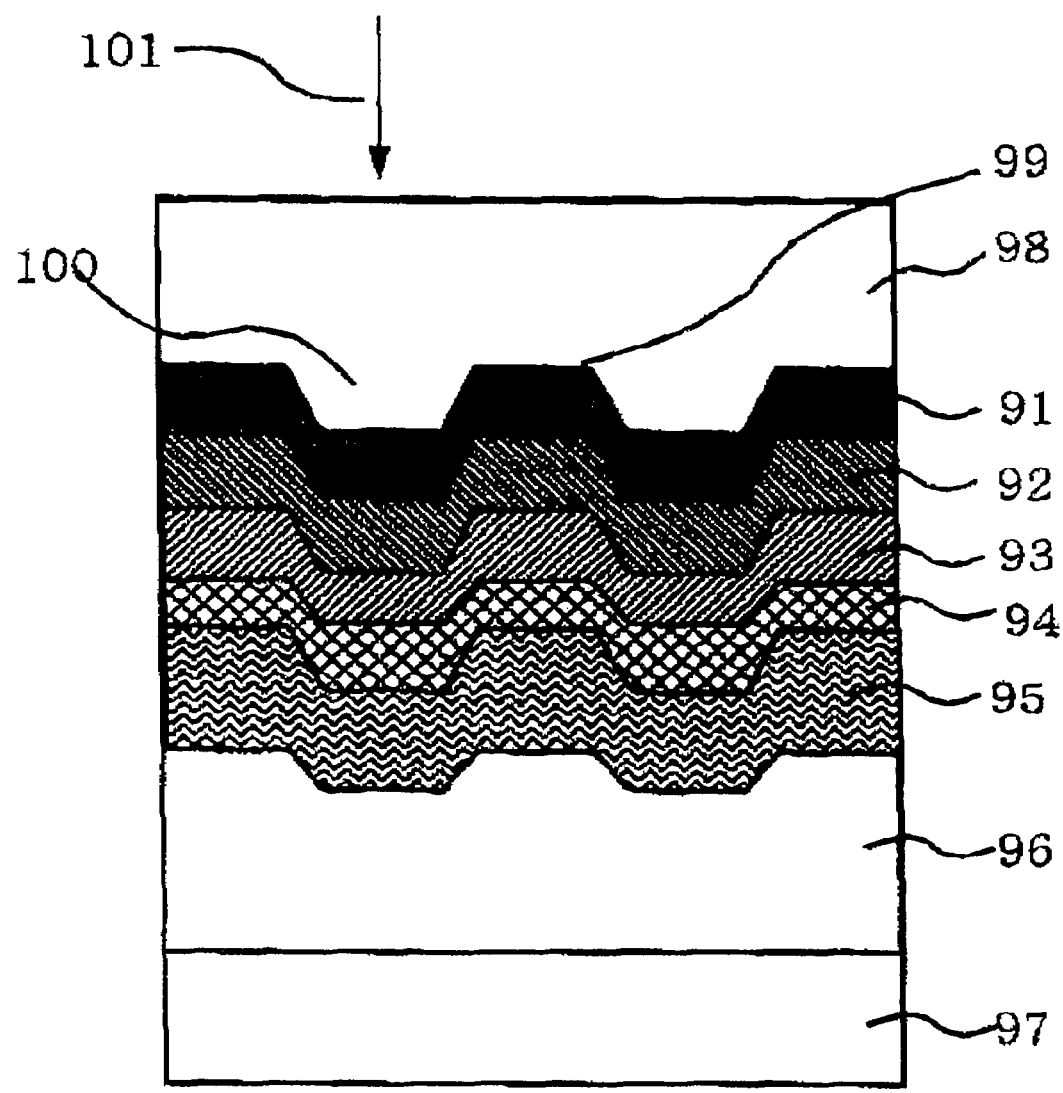
FIG. 11 is a view showing a structure of an information-storage medium in an embodiment of the present invention.
Figure 12:
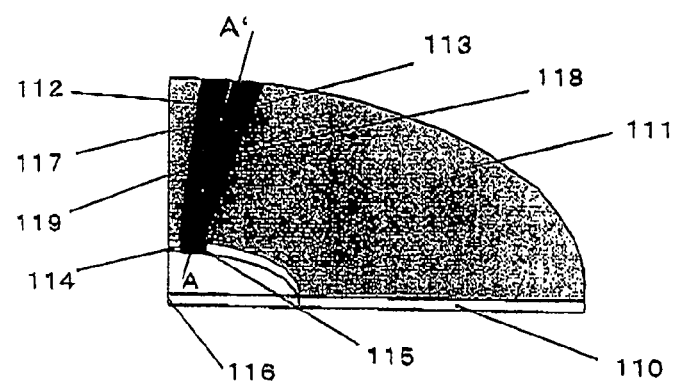
FIG. 12 is a view showing a structure of an information-storage medium in an embodiment of the present invention.
Figure 13:
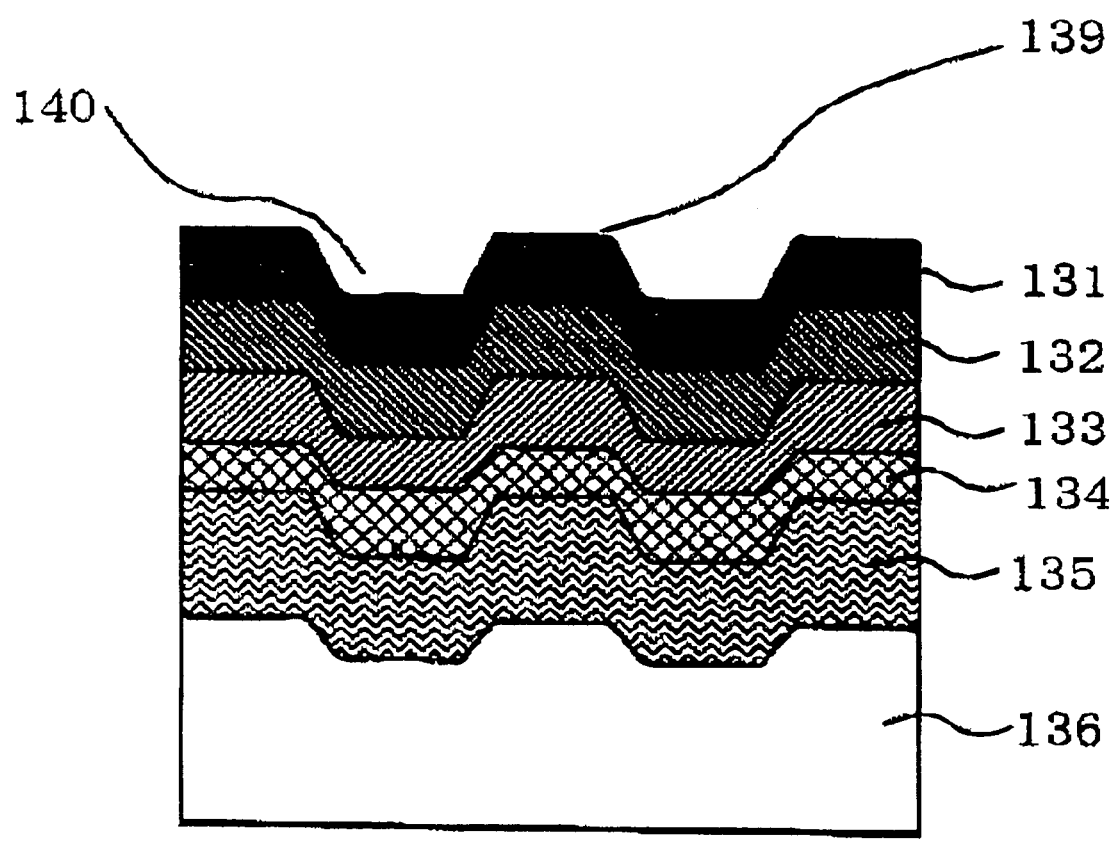
FIG. 13 is a view showing a structure of an information-storage medium in an embodiment of the present invention.

FIG. 12 is a view illustrating a disk-shaped information-recording medium of Example 1 of the invention. FIG. 12 shows a quarter of the disk. There are numerous transparent electrodes in the same shape arranged in a radial pattern on the entire surface of the disk, but only two of them are shown in FIG. 12. Recording or reproducing light enters from a top via a substrate, but the top substrate is eliminated in FIG. 12. FIG. 13 is an enlarged view of part of the disk. Recording and reproduction are often performed on a convex area so-called groove, as seen from the light spot, but are performed on a land area in this Example. The slit between the electrodes at the top of FIG. 12 corresponds to a gap between the radial electrodes in FIG. 12. The entire cross section A-A' is shown in FIG. 11.

The medium was prepared as described below. First, a transparent electrode (ITO) 135 (film thickness: 50 nm) having a composition of $(In_2O_3)_{90}(SnO_2)_{10}$ was formed on a polycarbonate substrate 136 having a diameter of 12 cm and a thickness of 0.6 mm, of which the addresses are indicated by the wobbles of grooves, and tracking grooves (width: 0.35 µm) for in-groove recording (in this case, recording on the land as seen from the light spot) having a surface track pitch of 0.74 µm and a depth of 23 nm as shown in FIG. 13. Transfer of a groove pattern onto the substrate surface was performed via a mother transferred once from a nickel master, the original plate having a plated photoresist layer. This is because the grooves formed on the photoresist by light exposure were made to correspond to the lands. FIG. 13 illustrates a process for coating the substrate. The transparent electrode is formed by sputtering by using a mask and divided into 20 radial regions corresponding to recording sectors.

Then, an electrochromic layer 134 was formed so that the layer had an average film thickness of 100 nm. The conductive electrochromic polymer material used for the electrochromic layer was an aqueous dispersion of poly(3,4-ethylenedioxythiophene) (0.5 weight %) and polyvinyl sulfonate (0.8 weight %), and the substrate was coated with the dispersion by using a spin-coating device at a rotational frequency of 3,000 rpm for 2 minutes and then heated on a digital hot plate at 100° C. for 5 minutes to remove water.

Then, an electrolyte layer 133 having a thickness of 100 nm was formed. The substrate obtained was further coated with an acetonitrile solution of polymethyl methacrylate (number-average molecular weight: 30,000) (5 weight %), polypropylene carbonate (PPC) (5 weight %), and lithium perchlorate (7 weight %) by using a spin-coating device at a rotational frequency of 1,000 rpm for 3 minutes and then dried on the digital hot plate at 100° C. for 5 minutes to remove acetonitrile. Note that the electrolyte layer is an example of thermally decomposable ionic conduction polymer electrolyte as described in item (a).

A reflection layer and second electrode layer 132 of a $W_{80}Ti_{20}$ film having a film thickness of 50 nm was formed on the electrolyte layer 133. The laminated film was formed by using a magnetron-sputtering device. A protective layer 131 having a thickness of 0.5 mm was formed with a UV resin on the second electrode. Note that, in FIG. 13, reference numeral "139" denotes a land area, and "140" a groove area.

To prevent a voltage from be poorly applied to an outer circumferential area due to an influence of sheet resistance of a transparent electrode and an influence in which thin portions in thickness are formed at the transparent electrodes corresponding to corner portions of a concave and convex of the groove, there was provided each of narrow metal (Al) electrodes 118 and 119 as shown in FIG. 12, which, before forming the transparent electrode on the substrate, was smaller in width than a radial transparent electrode and had radially an average width of approximately 100 µm and extended from an inner circumference to an outer circumference. The electrode was formed by sputtering while the information-recording medium is masked. Recording and reproduction of information is performed by avoiding the area of electrode. Note that, in FIG. 12, reference numeral "110" denotes a substrate; "111" a laminate film; "112" and "113" transparent electrodes; "114" and "115" extension electrodes from the transparent electrode; "116" the center of disk; and "117" a space between the electrodes.

In contrast to this Example, for recording in the groove as seen from the light spot, the transparent electrode and the reflection-layer electrode may be arranged reversely and the light may be introduced from the bonding substrate. In this case, the substrate was formed not by using the mother but by using a nickel master. In addition, the thickness of the bonding substrate may be reduced to approximately 0.1 mm, and the NA of the focusing lens may be increased to 0.85. If so, it is possible to achieve about ¾ of a track pitch, i.e., a pitch of approximately 0.54 µm.

It is preferable to form a compound film of elements smaller in ionic radius than Li, such as $SiO_2$, $GeO_2$, and the like, having a, film thickness of about 1 to 5 nm between the transparent electrode and the electrochromic material layer, whereby invasion or penetration of Li into the transparent electrode can be prevented. However, the voltage to be applied requires to be increased by several volts.

The transparent electrode is not necessarily divided into a plurality of fan-shaped transparent electrodes and the entire disk may be a single electrode. However, it is preferable to divide the electrode, for reducing the interelectrode capacity and thus for accelerating the application and elimination of the voltage. The interelectrode capacity is particularly preferably 0.1 F or less for bringing the time required for colorization and decolorization and the current into practical ranges, but is preferably 0.01 F or more for improvement in the properties of the device. The transparent electrode may not be divided into a plurality of fan-shaped electrodes and the metal electrode may be divided. Further, both top and bottom electrodes may be divided. In such a case, the gaps between the divided electrodes on the top and bottom surfaces may coincide with each other or may not.

Figure 14:
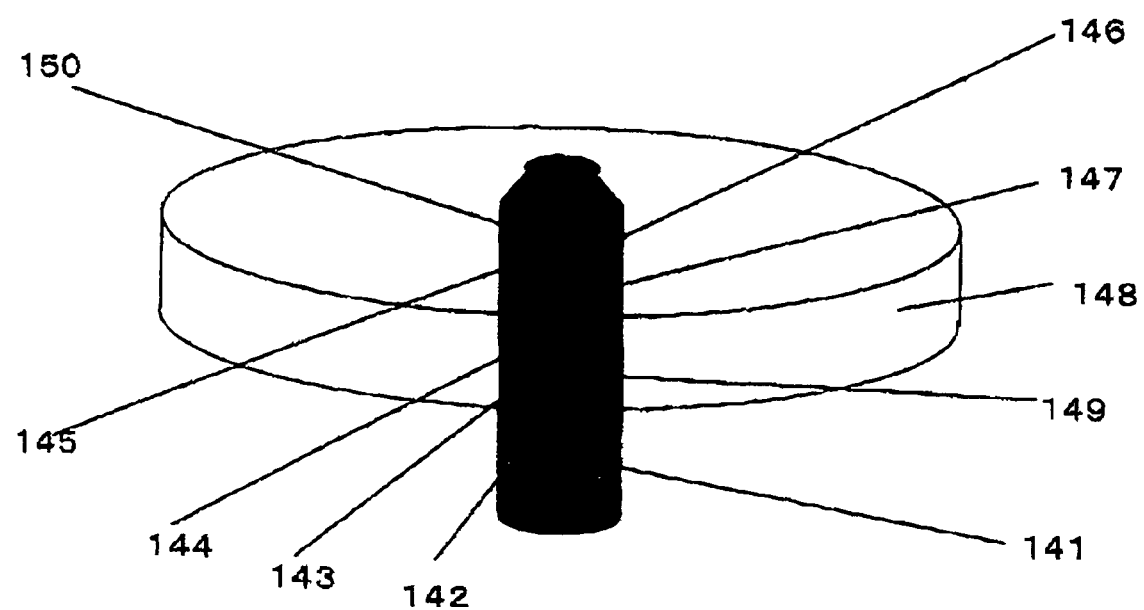
FIG. 14 is a view showing an electrode of a disk holder portion to be set on an information-storage medium in an embodiment of the present invention.

Extension electrodes, which are connected respectively to the internal edges of the reflection-layer electrode and the transparent electrode, extend to the utmost inner area of the disk and connected a plurality of electrodes 114 and 115 at the edge of the disk central hole, respectively for connection to other electrodes on the disk rotating shaft of the information-reproducing device as shown in FIG. 12. As shown in FIG. 14, six divided electrodes are adhered to the side of the rotating shaft of disk-rotating motor 141 passing through the disk-receiving circular plate 148 at the height where the disk is placed, and are compatible with the multi-layered disk (up to five-layered disk), and will be described in Example 2 (in FIG. 14, three out of six electrodes, 145, 146, and 147 are shown), and the shaft has a protrusion 150 or dent (concave) in the vertical direction at a position on the circumference of the rotating shaft, which is engaged with the dent or protrusion at a position of the central hole of the disk to position the disk and connects predetermined electrodes to each other. Power is supplied to the respective electrodes on the disk-rotating shaft from the circuit substrate of recording device by coming a plurality of brushes and rings 142, 143, and 144. Any other methods may be used for supplying power.

The recording and reproducing laser beam was irradiated from the substrate side. Alternatively, the laser beam may be introduced from a transparent electrode side, i.e., bonding substrate side, by using the finally attached electrode layer as a transparent electrode. However, in such a case, the thickness of the recording layer was determined so that the reflectance becomes about 10% and a sufficiently high reading contrast ratio is obtained.

(Electrochromic Characteristics)

Figure 15:
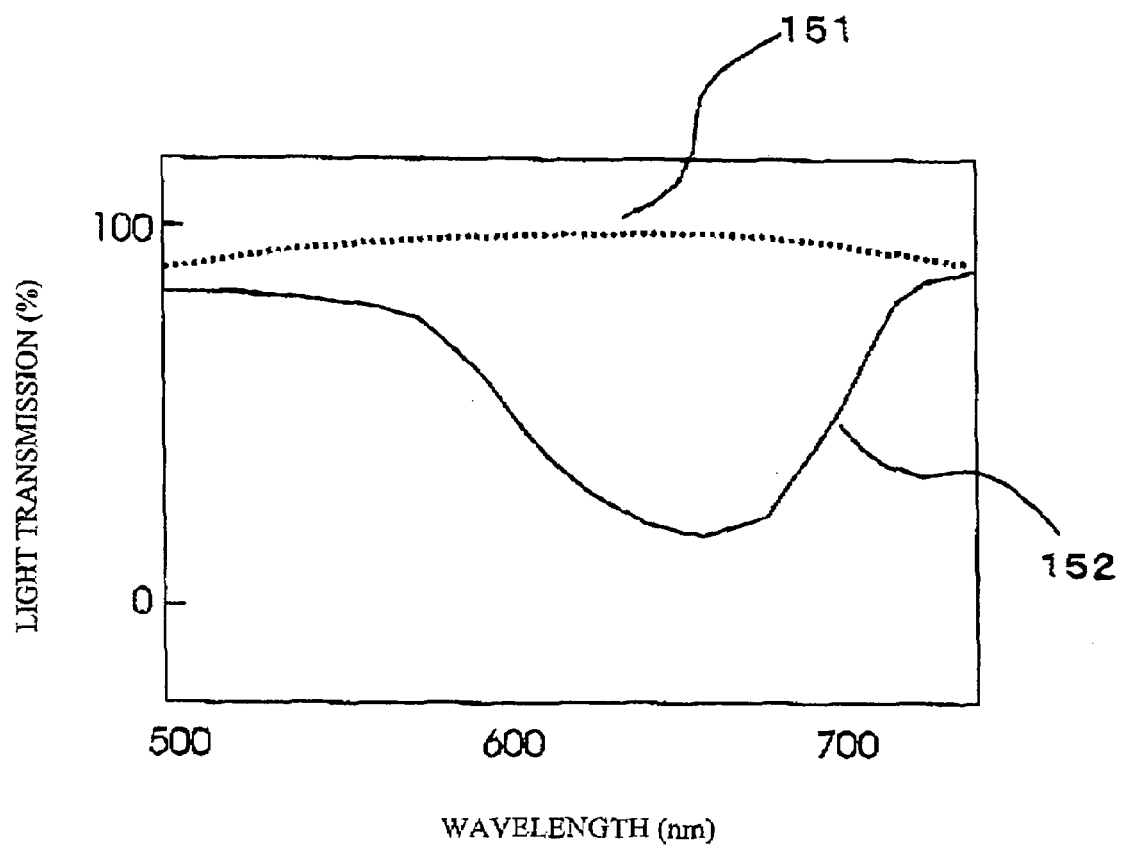
FIG. 15 is a view showing an absorption spectrum of an electrochromic layer of an information-storage medium in an embodiment of the present invention.

Properties of the electrochromic layers in the information-recording medium thus prepared were evaluated. FIG. 15 shows an absorption spectrum of the information layer in the visible region (wavelength: 500 to 700 nm). The measurement was made in a sufficiently steady state after 1 minute from application of voltage to the electrodes at the center of the disk. In regard to the direction of the voltage application, the electrode on the electrolyte layer side in the information and electrolyte layers adhered to each other was made positive. In FIG. 15, the information region was almost completely transparent in the wavelength region of 550 to 700 nm when the voltage was not applied as shown by a dotted line 151, but showed an absorption band having the absorption maximum at a wavelength of 660 nm when a voltage of +3.0 V was applied as shown by a solid line 152. At that time, the transmittance at a wavelength of 660 nm was 40%.

Figure 16:
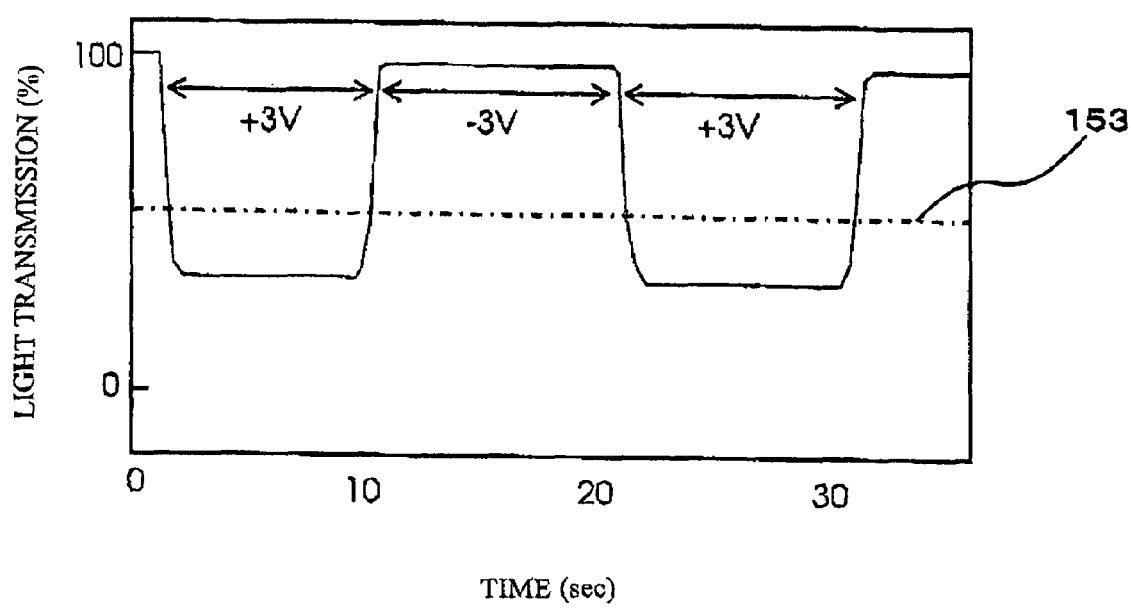
FIG. 16 is a view showing a change in a light transmission at a wavelength of 660 nm at a time of switching a voltage to be applied to an electrochromic layer of an information-storage medium in an embodiment of the present invention.

FIG. 16 shows a change in the light transmission at a wavelength 660 nm of the information layer in accordance with the switching of voltages of +3 V and −3 V. The voltage was switched at an interval of 10 seconds. The broken line 153 indicates the minimum color density required for recording and reproduction, i.e., a light transmission of 60%. Thereby, it has been proved that the color density of the information layer of the prepared information-recording medium is sufficiently high. The time taken to lead to the color density required for recording and reading from the non-colored state, and the time taken to return to the non-colored (fading) state from the colored state were both about 1 second.

(Recording and Reproduction)

Figure 17:
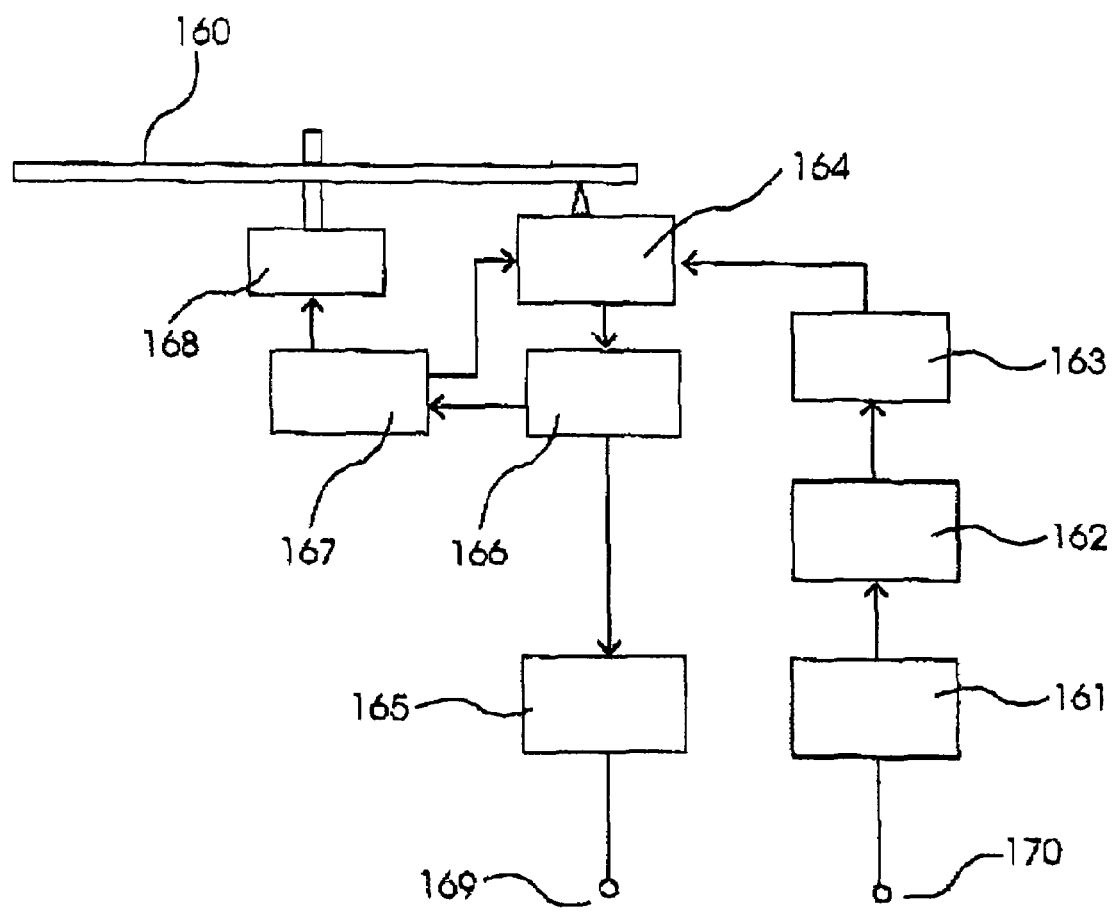
FIG. 17 is a block diagram of an applied voltage-controlling circuit in an embodiment of the present invention.

Information was recorded and reproduced by using the above information-recording medium. Hereinafter, an operation of the information recording and reproducing will be described with reference to FIG. 17. There will be described information reproduction by using a ZCAV (Zoned Constant Linear Velocity) method, wherein disk rotational frequency is changed in every zone for record, as the motor-controlling method. In FIG. 17, reference numeral "166" denotes a pre-amplifier circuit; "167" an L/G servo circuit; "168" a motor; "169" a signal input; and "170" a signal output.

Information in an 8-bit format is sent from outside the recording device to an 8-16 modulator 161. When the information is recorded on an information-recording medium (hereinafter, referred to as "optical disk") 160, the information is recorded by a method of modulating an 8-bit information into 16-bit information, so-called 8-16 modulation method. By this modulation method, information having a mark length of 3T to 14T and corresponding to the 8-bit information is recorded on the medium. The 8-16 modulator 161 in the FIG. 17 conducts this modulation. Here, "T" represents the clock frequency during the information recording. The disk was rotated at a linear velocity of about 8 m/s relative to the light spot.

The 3T to 14T digital signals modulated by the 8-16 modulator 161 are sent to a recording waveform-generating circuit 162, whereby a multi-pulse recording waveform is generated.

At that time, a high power level of 5 mW was used for forming a record mark and an intermediate power level of 2 mW for removing the record mark, and the lowest power level was 0.1 mW. The laser power for forming the record mark declines by applying a larger voltage, and information is favorably recorded in the ranges of 0.5 mW or more and 5 mW or less. The range did not vary significantly even when the linear velocity was changed from 8 m/s. The information was read at a voltage of 1 mW without application of voltage. The information could be read practically in the ranges of 0.2 mW or more and 2 mW or less. Reading for a long time at the power of more than 2 mW resulted in deterioration of the recorded data. In addition, in the above recording waveform-generating circuit, the 3T to 14T signals are made to correspond mutually to "0" and "1" in chronological order. At that time, the regions irradiated with a high-power level pulse become lower in electrochromism and less easily colored. In addition, the recording waveform-generating circuit 162 contains a multi-pulse waveform table compatible with the method of changing the head and tail pulse widths of the multi-pulse waveform according to the length of the space before and after the mark during generating a series of high-power pulse train for forming a mark (compatible recording waveform control), which generates a multi-pulse recording waveform that significantly eliminates the influence of the interference by the heat generated between the marks. The recording waveform generated in the recording waveform-generating circuit 162 is then transferred to a laser-driving circuit 163, which triggers emission of a semiconductor laser from the optical head 164 with the recording waveform.

The optical head 164 of the recording device employs a semiconductor laser having a wavelength of 660 nm as the information-recording laser beam. Further, information is recorded by focusing and irradiating the laser beam onto a particular area on the information layer of the optical disk 160 by using an objective lens having a lens NA of 0.65.

Figure 22:
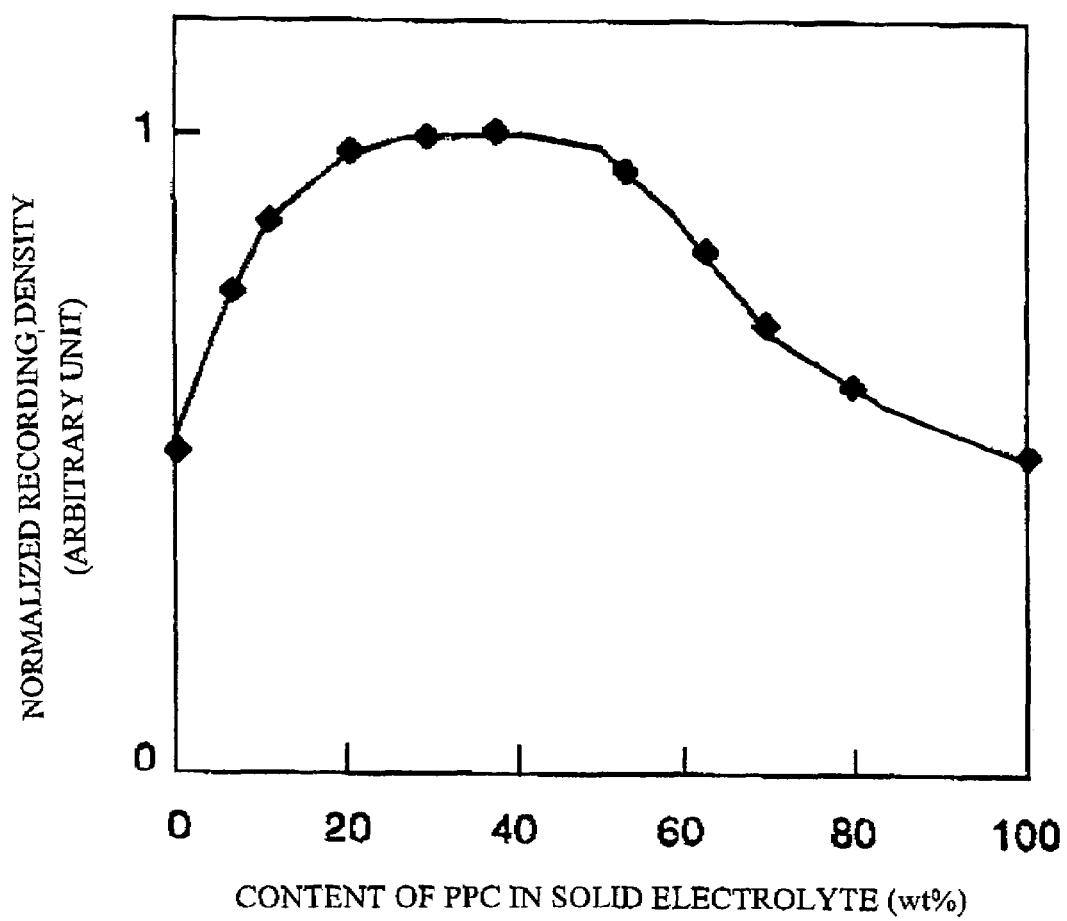
FIG. 22 is a chart illustrating a relationship between a composition of a solid electrolyte and a recording density in an embodiment of the present invention.

Media different in solid electrolyte composition were prepared by changing the ratio of PMMA to PPC stepwise, and the maximum recording density of the record successfully reproduced from each medium was determined. The results are shown in FIG. 22. The maximum recording density was obtained when the content of PPC in the solid electrolyte was in the range of 30% to 50%. The recording density declined due to insufficient sensitivity to the recording light when the content was 30% or less, and due to expansion of the record mark when the content was 50% or more. In addition, the recording density was 50% of the maximum value when only PMMA was used (PPC: 0%).

If an electrochromic layer of a conductive electrochromic polymer material is used, the reflectance of the medium is lower in the colored state and the reflectance thereof in the region recorded and less easily colored any more was higher. During recording by laser beam irradiation, a voltage of 3 volt is applied intermittently between the electrodes on both faces of the information layer.

In the information-recording medium structure of this Example, the top and bottom electrodes are placed closely to each other only in the groove area, and thus the area of the recording film to which a high electric field is applied is narrower. Therefore, even when a light spotting site or a light concentration ratio is more or less changed, information can be recorded similarly. Accordingly, the medium is more tolerant of displacement of AF or tracking, and there are more highly sensitive to light and thus suitable for high-rotational speed recording.

In addition, the information-recording medium of this Example provided a contrast ratio of the light reflectances between the record mark and the other area at about 2:1. If the contrast ratio is less than the above ratio, fluctuation due to the noise of reproduced signal exceeds an upper limit value of 9%, i.e., beyond the range of practical reproduced-signal quality. A transparent electrode of $(SiO_2)_{40}(In_2O_3)_{55}(SnO_2)_5$, which was prepared by adding $SiO_2$, was optically more advantageous, and thereby the refractive index of the electrode layer decreased and the contrast ratio rose to 2.5:1.

Information can be simultaneously recorded easily by forming multiple light spots on the same recording tracks as or on recording tracks different from that of a single or multiple optical heads.

The recording device is compatible with a method of recoding information only on lands among the grooves and the lands (modification of a so-called in-groove recording method).

Reproduction of the recorded information is also performed by using the above optical head. Reproduced signal can be obtained by irradiating a laser beam on a recorded mark and detecting the reflected lights from the mark and the other areas. The amplitude of these reproduced signals is amplified in a pre-amplifier circuit, and the signals in 16-bit format are then modulated by the 8-16 demodulator 165 to 8-bit information. In the above manner, the recorded marks are finally reproduced.

When mark-edge recording is performed under the condition described above, the mark length of 3T mark that is the minimum mark was approximately 0.20 μm while the mark length of 14T mark that is the maximum mark was about 1.96 μm. The record signals contain dummy data consisting of a repetition of 4T marks and 4T spaces at the head and tail portions of the information signals. The head portion also contains VFO.

(Mark-Edge Recording)

In DVD-RAM and DVD-RW, a mark-edge recording method that allows high-density recording is adopted. The mark-edge recording is made to correspond to a method of allocating one piece of digital data to both ends of a record mark formed on a recording film, whereby the length of the shortest record mark is made to correspond not to single standard clock but to 2 to 3 standard clocks and the density of recording can be increased. DVD-RAM, which adopts the 8-16 modulation method, is compatible with three standard clocks. The mark-edge recording method has the advantage that it allows high-density recording even when the record marks are extremely small as compared to the mark position recording in the central position of a circular record mark is made to correspond to the one piece of digital data. However, the information-recording medium requires to make lower the distortion of the shape of record mark.

(ZCLV and CAV Recording Methods)

In information-recording media using a conductive electrochromic polymer material, if the recording waveform is the same, it is preferable to record an optimum linear velocity in order to obtain favorable information reproduction properties. However, when the information recorded on different recording tracks having different radii on the plate is accessed, it takes an extended time to change the rotational frequency to make the linear velocity the same. Therefore, in DVD-RAM, there is adopted a ZCLV (Zoned Constant Linear Velocity) method in which the disk is divided into 24 zones in the direction of the disk radius for preventing decrease in access speed and the disk is scanned at a certain rotational frequency in the same zone and the rotational frequency is changed only when the information in other zones is accessed. In this method, the recording density may vary slightly since the linear velocities are slightly different between the utmost inner and outer tracks in the same zone. However, it is possible to record almost at the maximum density over the entire area of the disk.

On the other hand, the CAV record method having a constant rotational frequency is advantageous in that the rotational frequency may not be changed when the information stored at sites different in the radius direction is accessed, and thus the method is suitable for mobile devices since power consumption is supplied in changing the rotational frequency. As described above, the present invention has the effects of making CAV recording more easily conducted since a constant heating time can be obtained independent of the position in the radius direction.

(Electrode Material)

It is important that the electrode material has an optical property that does not absorb light, namely, is transparent in the wavelength region of the recording laser beam. Examples of the materials for use as transparent electrodes include materials having a composition of $(In_2O_3)x(SnO_2)1-x$ where "x" is a material in the range of 5% to 99%; or more preferably the range of 90 to 98% in view of resistance, or a material of $SiO_2$ having a content of 50 moles or less and a material in which other oxide such as $Sb_2O_3$ having a content of 2 to 5 mole % is added to $SnO_2$ are available as "x". In addition, fluorine-doped $SnO_2$ is also usable since it is lower in resistance and higher in light transmission. Alternatively, IZO (Indium zinc oxide) may be used as the electrode layer since it allows formation of a smoother surface electrode layer. Since the electrode layer on the rear side of the information-recording medium as seen from the side of incident laser beam is not necessarily highly transparent, a metal suitable for optical disks may be used. If the metal layer higher in reflectance and thermal conductivity is made of Al or an Al alloy, it is preferably that the metal layer is a high-thermal conductivity material containing an added element such as Cr, Ti, or the like in an amount of 4 atom % or less in order to prevent an increase in temperature of the substrate surface. Alternatively, a layer made of a single element such as Au, Ag, Cu, Ni, Fe, Co, Cr, Ti, Pd, Pt, W, Ta, Mo, Sb, Bi, Dy, Cd, Mn, Mg, or V; or an alloy having the above element as the primary component such as an Au alloy,. Ag alloy, Cu alloy, Pd alloy, Pt alloy, Sb—Bi, SUS, or Ni—Cr: or an alloy of the above alloys may also be used. Accordingly, the electrode and reflection layer is made of a metal element, a semimetal element, one of these alloy, or a mixture thereof. Among them, single substances such as Cu, Ag, and Au: a Cu or Ag alloy, in particular, containing an added element such as Pd, Cu, or the like in a content of 8 atom % or less; or metals higher in thermal conductivity such as an Au alloy and the like suppress thermal deterioration of the used organic materials. A conductive organic material having a narrow-band gap structure, which does not have an absorption band in the infrared region, such as a polythiophene derivative, a polypyrrole derivative, and polyacetylene may also be used.

(Substrate)

In this Example, a polycarbonate substrate having a tracking groove directly formed on the surface was used. The substrate having the tracking groove is a substrate having a groove with a depth of $\lambda/15n$ (n represents the refractive index of substrate material) or more when the wavelength of the recording and reproducing light is designated as $\lambda$ on all or partial area of the substrate surface. The circular groove may be formed continuously, or the groove may be divided thereon. It was found that a groove depth of about $\lambda/12n$ is preferable from the point of the balance between tracking and noise. In addition, the groove width may be varied in particular areas. A substrate in the format of recording on and reproducing information from the groove and land or a substrate in the format information that is recorded only one of them may be used. In the substrate of a recording type only on the groove, the track pitch is preferably about 0.7 time as long as the wavelength/NA of the focusing lens, and about ½ time as long as the groove width.

(Recording Laser Power)

Laser power used for recording information on the information-recording medium of this Example was set to 8 mW under the condition of a recording linear velocity of 8 m/s or more.

(Reading Laser Power)

The reading laser power was set to 1 mW.

If a four-element array laser is used as, for example, a laser beam source, a data transfer rate can be increased four times.

(Conductive Electrochromic Polymer Material)

Recording and reproduction of information was possible when poly(3,4-ethylenedioxypyrrole), poly(3-hexylpyrrole), poly(3,4-butylenedioxythiophene), or poly(3,4-dimethyl-3,4-dihydro-2H-thieno-[3,4-b]-[1,4]-dioxepine) was used as a conductive electrochromic polymer material for use in the information layer.

However, polythiophene and polythiophene derivatives, which are more easily doped with a donor represented by $Li^+$ and resistant to oxidation in the neutral state, are more favorable as conductive electrochromic polymer materials, Recording and reproduction of information was also possible in a similar manner on an information-recording medium employing polythiophene, poly(3,4-propylenedioxythiophene), poly(3,4-dimethoxythiophene), or poly(3-hexylthiophene) replacing poly(3,4-ethylenedioxythiophene).

(Materials for Electrolyte Layer)

Recording and reproduction of information was also possible on an information-recording medium that employs polyethylene carbonate instead of polypropylene carbonate as the polymer for electrolyte layer.

Recording and reproduction of information was also possible when lithium triflate, lithium hexafluorophosphate, lithium tetrafluoroborate, or N-lithio-trifluoromethanesulfonimide was used as the electrolyte salt replacing lithium perchlorate.

The recording in this Example is based on a principle of irreversible chemical reaction of the polymer used for the electrolyte layer and so is a multi-session type recording.

EXAMPLE 2

This Example relates to an information-recording medium that allows use of a short-wavelength laser for recording and reading. The structure and the preparative method of the medium are the same as those described in Example 1.

A transparent electrode (film thickness: 30 nm) of $SnO_2$ was formed on a polycarbonate substrate having a diameter of 12 cm and a thickness of 0.6 mm, having tracking grooves (width: 0.25 μm), a track pitch of 0.45 μm and a depth of 23 nm for in-groove recording (land recording as seen from the light spot) on the surface, of which addresses are expressed by the wobble of grooves. Transfer of a groove pattern onto the substrate surface was conducted by using a mother transferred once from a nickel master, i.e., an original plate with a plated photoresist. The transparent electrode was formed by sputtering by using a mask, and divided into 20 radial regions corresponding to recording sectors.

Subsequently, an electrochromic layer having a film thickness of 100 nm was formed. The electrochromic layer was formed by using an aqueous dispersion of poly(3,4-dimethoxythiophene) (0.5 weight %) and polyvinyl sulfonate (0.8 weight %) as the conductive electrochromic polymer material, applying the solution by means of a spin-coating device under the condition of a rotational frequency of 3000 rpm, and heating the coated layer on a digital hot plate at 100° C. for 5 minutes for removal of the solvent.

Then, an electrolyte layer having a thickness of 100 nm was formed. A cyclohexanone solution of polymethyl methacrylate (number-average molecular weight: 30,000) (5 weight %), polypropylene carbonate (5 weight %), and lithium perchlorate (7 weight %) was prepared. The electrolyte layer was formed by applying the solution by means of a spin-coating device under the condition of a rotational frequency of 1,000 rpm and a period of 3 minutes and heating the coated film on the digital hot plate at 100° C. for 5 minutes for removal of acetonitrile. On the electrolyte layer, a reflection-layer second electrode layer having a film thickness of 50 nm made of a $W_{80}Ti_{20}$ film was then formed. The laminate film was formed by using a magnetron-sputtering device. On the second electrode, a protective layer having a thickness of 0.5 mm was formed by using a UV resin.

Figure 18:
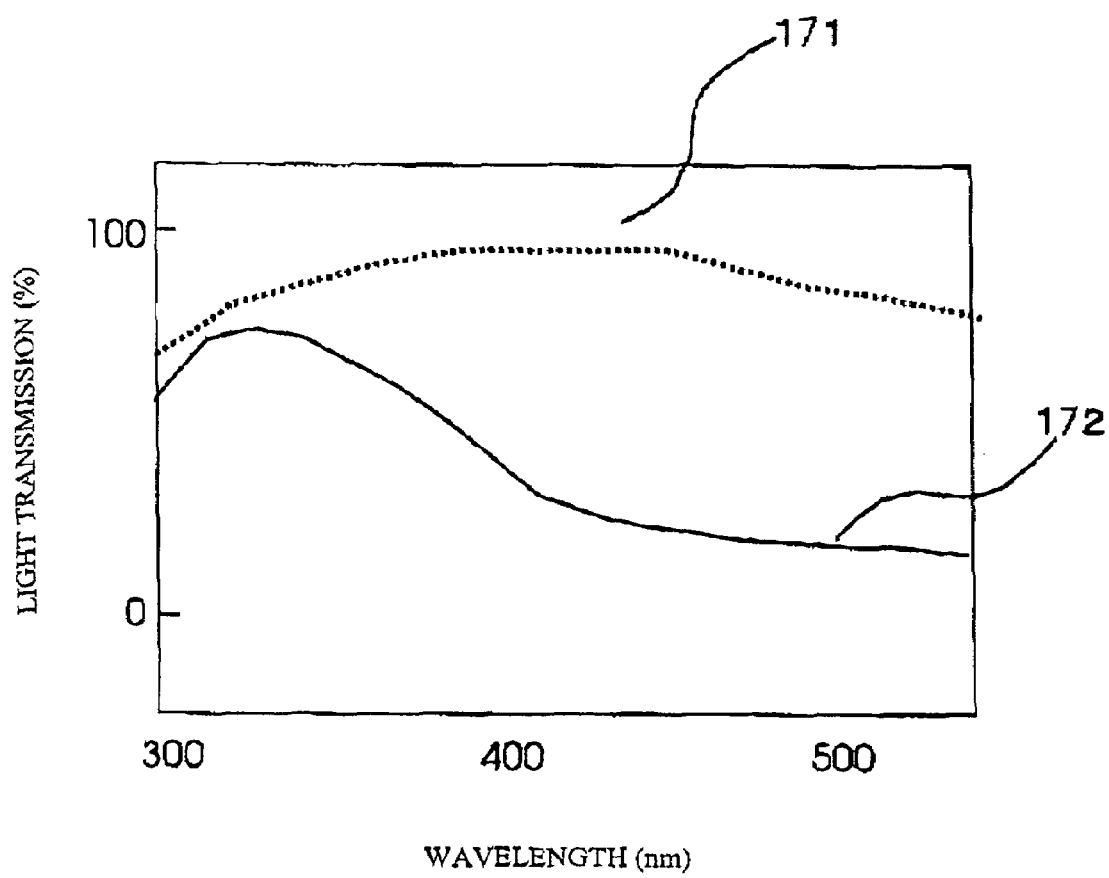
FIG. 18 is a view showing an absorption spectrum of an electrochromic layer in an embodiment of the present invention.

FIG. 18 is an absorption spectrum when a voltage is applied between a pair of the first and second electrodes on the information-recording medium of this Example. The spectrum was obtained in a sufficiently steady state after 1 minute from application of voltage. In regard to the direction of voltage application, the electrode on the electrolyte layer side in the information and electrolyte layers adhered to each other was made positive. In FIG. 18, a dotted line 171 is a spectrum when a voltage of −1.0 v was applied, while a solid line 172 is a spectrum when a voltage of +3.0 V was applied. A new absorption band appeared at a wavelength of about 400 nm, when a voltage of +3.0 V was applied. Therefore, this medium is suitable for recording by using a blue violet semiconductor laser having a wavelength of 400 nm.

In a similar manner to Example 1, information was recorded on and reproduced from the information-recording medium thus prepared according to the method shown in FIG. 17. A semiconductor laser having a wavelength of 400 nm was used as the information-recording laser beam. Information was recorded on the information layer by focusing and irradiating a laser beam having a strength of 6 mW by using an objective lens having a lens NA of 0.65, and reproduced by using a laser beam having a strength of 0.5 mW.

Recording and reproduction of information was also possible when poly(3,4-ethoxythiophene), poly(3-butylthiophene), poly(3,4-butylenedioxythiophene), or poly(3,4-dimethyl-3,4-dihydro-2H-thieno-[3,4-b]-[1,4]-dioxepine) was used as the conductive electrochromic polymer material in an analogous manner.

EXAMPLE 3

This Example relates to an information-recording medium that employs a thermally crosslinkable electrolyte. The structure and the preparative method of the medium are the same as those described in Example 1.

A transparent electrode (film thickness: 30 nm) of $SnO_2$ was formed on a polycarbonate substrate having a diameter of 12 cm and a thickness of 0.6 mm, and tracking grooves (width: 0.25 μm) having a track pitch of 0.45 μm, and a depth of 23 nm for the in-groove recording (land recording as seen from light spot) on the surface, of which the addresses are expressed by the wobble of grooves. Transfer of a groove pattern onto the substrate surface was conducted by using a mother transferred once from a nickel master, i.e., a original plate with a plated photoresist. The transparent electrode is formed by sputtering by using a mask, and divided into 20 radial regions corresponding to recording sectors.

Subsequently, an electrochromic layer having a film thickness of 100 nm was formed. The electrochromic layer was formed by using an aqueous dispersion of poly(3,4-dimethoxythiophene) (0.5 weight %) and polystyrenesulfonic acid (0.8 weight %) as the conductive electrochromic polymer material, applying the solution by means of a spin-coating device under the condition of a rotational frequency of 2,000 rpm for 2 minutes, and the heating the coated layer on a digital hot plate at 100° C. for 5 minutes for removal of the solvent.

Then, an electrolyte layer having a thickness of 100 nm was formed. A cyclohexanone solution of polymethyl methacrylate (number-average molecular weight: 10,000) (5 weights), a bifunctional methacrylic compound, diethylene glycol dimethacrylate (DEDM) (5 weight %), polypropylene carbonate (7 weight %), and lithium perchlorate (7 weight %) was prepared. The electrolyte layer was formed by applying the solution by means of a spin-coating device under the condition of a rotational frequency of 1,000 rpm and a period of 3 minutes, and heating the coated film on a digital hot plate at 100° C. for 5 minutes for removal of acetonitrile. A reflection-layer second electrode layer having a film thickness of 50 nm made of a $W_{80}Ti_{20}$ film was then formed on the electrolyte layer. The laminated film was formed by using a magnetron-sputtering device. On the second electrode, a protective layer having a thickness of 0.5 mm was formed by using a UV resin.

In a similar manner to Example 1, information was recorded on and reproduced from the information-recording medium thus prepared according to the method of FIG. 17. A semiconductor laser having a wavelength of 660 nm was used as the information-recording laser beam. Information was recorded on the information layer by irradiating and focusing a laser beam having a strength of 10 mW by means an objective lens having a lens NA of 0.65, and reproduced by using a laser beam having a strength of 0.5 mW.

Figure 23:
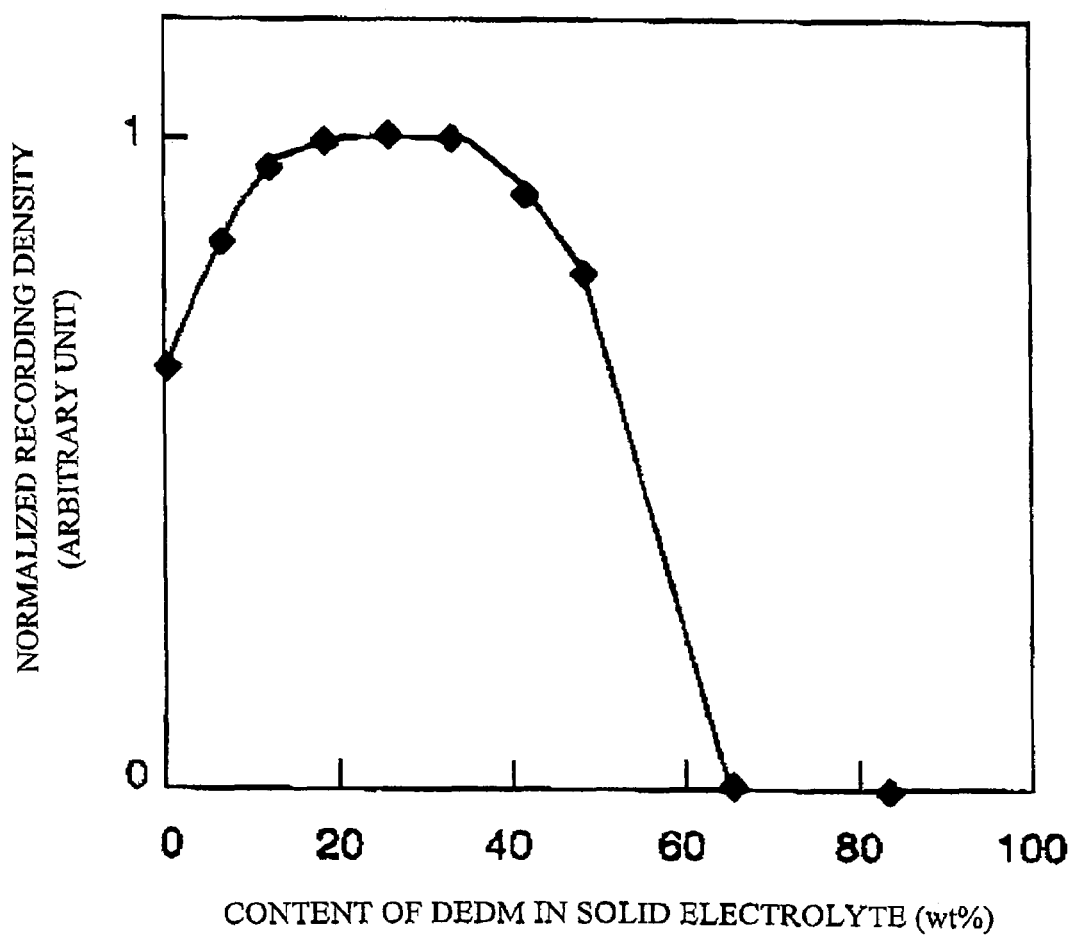
FIG. 23 is a chart illustrating a relationship between a composition of a solid electrolyte and a recording density in an embodiment of the present invention.

Media different in solid electrolyte composition were prepared by changing the ratio of PMMA to DEDM stepwise, and the maximum recording density of the record successfully reproduced from each medium was determined. FIG. 23 shows the results. The maximum recording density was obtained when the content of DEDM in the solid electrolyte is in the range of 20 to 35%. When the content of DEDM is 65% or more, the solid film could not be formed, so that information reproduction too could not be conducted. When only PMMA is used (DEDM: 0%), the recording density was 65% of the maximum value.

Recording and reproduction of information were possible in an analogous manner when tetramethylolmethane tetraacrylate or trimethylolpropane polyglycidylether was used instead of diethylene glycol dimethacrylate as the crosslinkable or polymerizable compound for use in the electrolyte layer.

Recording of information was possible by using the laser beam having a strength of 8 mW when 1 weight % of tert-butyl peracetate was added to the electrolyte layer.

EXAMPLE 4

Figure 19:
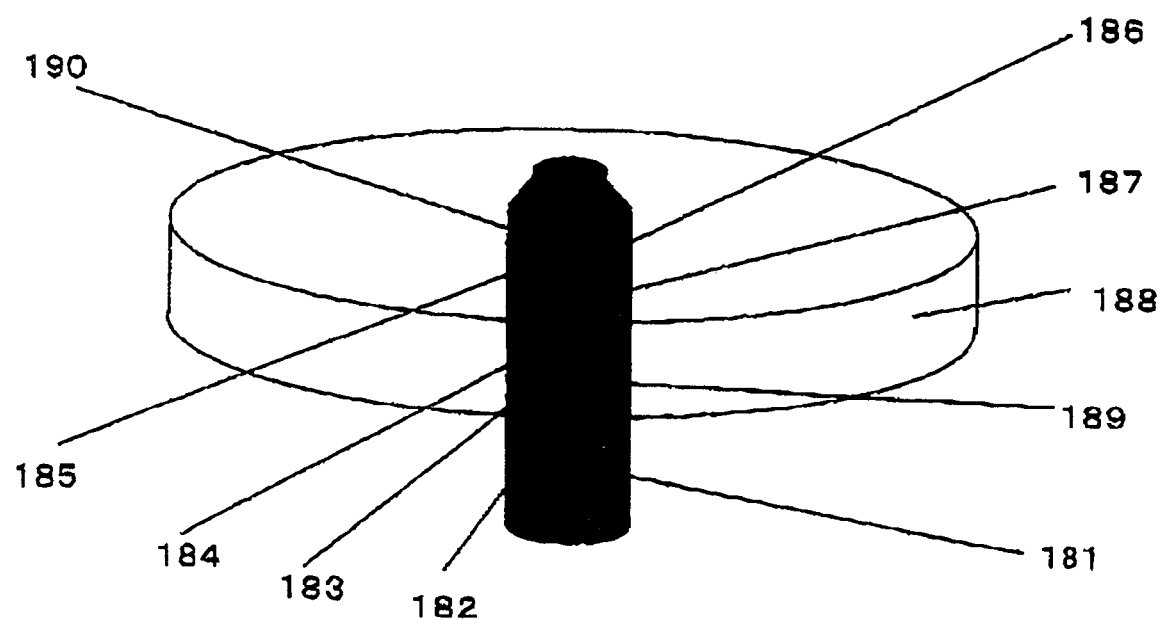
FIG. 19 is a view of an electrode of a disk holder portion to be set on an information-storage medium in an embodiment of the present invention is connected.
Figure 20:
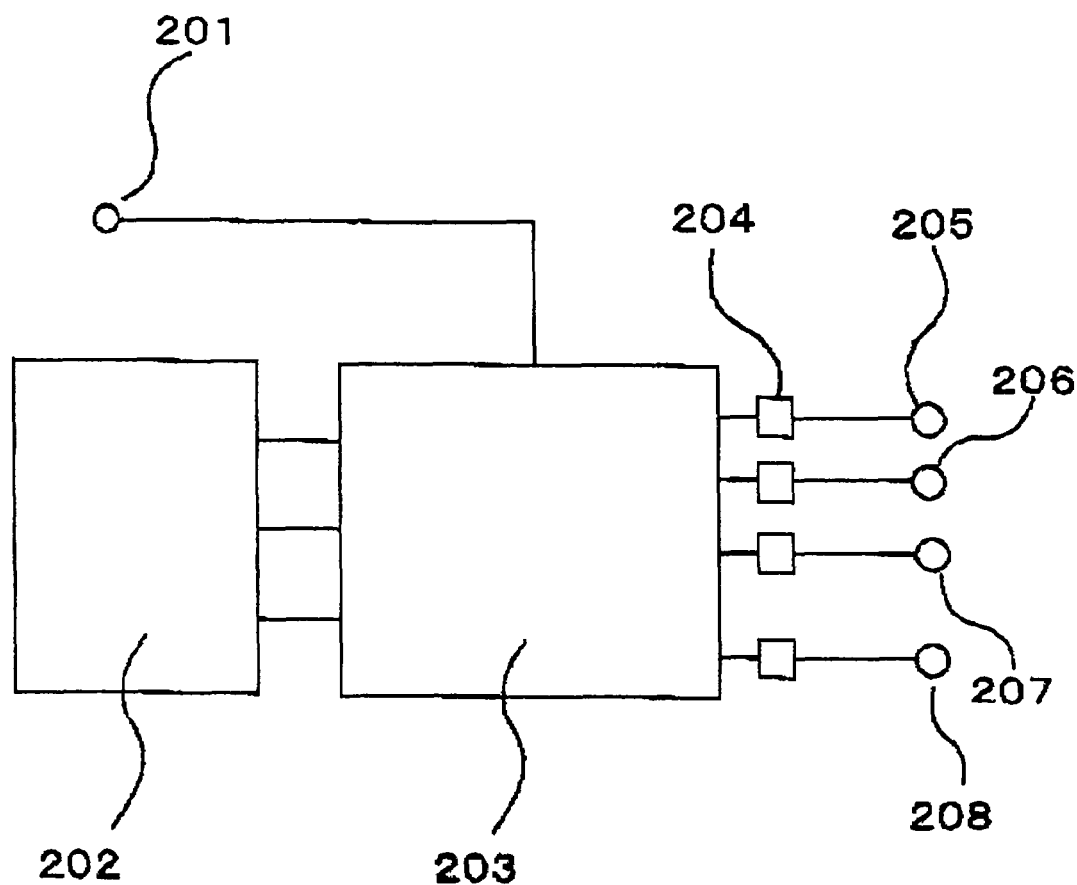
FIG. 20 is a block diagram of applied voltage-controlling circuit to a medium in an embodiment of the present invention.

This Example relates to a multi-layer structure information-recording medium and the recording device using the same. FIG. 19 shows a structure around the rotating shaft of the recording device in this Example, and FIG. 20 is a block diagram illustrating a recording device-controlling circuit. Voltage is applied and signals selecting a layer in the information-recording medium are supplied to three slip rings 182, 183, 184 of the rotating axis from the recording device. The circuit containing a condenser shown in FIG. 20 is placed in the hollow space of a disk-bearing part 188, and the wirings to respective layers shown to the right edge of the circuit block diagram are connected via an applied voltage switching and controlling circuit to the electrodes 185, 186, and 187 on the rotating axis. In FIG. 20, reference numeral "201" denotes a layer-selection signal; "202" a variable power source; "203" a layer-selection circuit; "204" an electric current controller; "205" a signal selecting the first layer; '206' a signal selecting the second layer; '207' a signal selecting the third layer; and "208" a signal selecting the fourth layer. There are a total of eight electrodes, but other five electrodes are invisible as they are placed on the other side of the rotating axis and thus not shown in FIG. 19. In this manner, a positive voltage is applied to the layer to be colored while a negative voltage is applied for decolorization. In FIG. 19, reference numeral "181" denotes a rotating shaft; "185" a first contact electrode; "186" a second contact electrode; "187" a third contact electrode; "189" an insulator; and "190" a positioning protuberance.

Figure 21:
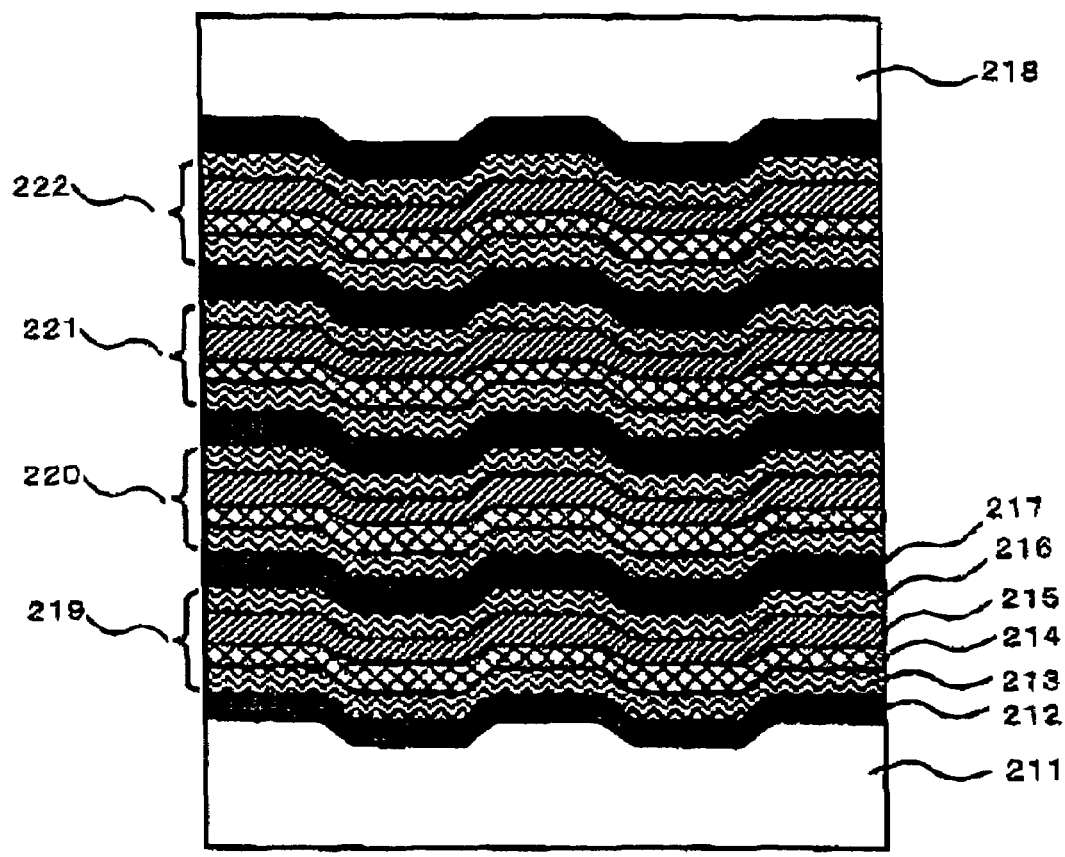
FIG. 21 is a view illustrating a structure of a four-layered information-storage medium in an embodiment of the present invention.

The basic structure of the information-recording medium is the same as that of the Example 1. As shown in FIG. 21, the information-recording medium had a diameter of 12 cm and a thickness of 0.6 mm and had a tracking groove for in-groove recording, wherein the tracking groove had a track pitch of 0.74 μm, a depth of 23 nm, and a groove width of 0.35 μm on a surface of the medium and wherein a first laminate layer 219 was obtained by forming a $SiO_2$ layer (10 nm) 212, an IZO transparent electrode (30 nm) 213, an electrochromic layer (80 nm) 214, an electrolyte layer (80 nm) 215, and an IZO transparent electrode (30 nm) 216 sequentially in this order on a polycarbonate substrate 211 having address information as the wobble of the above-mentioned groove. After a ZnS—$SiO_2$ insulation layer (100 nm) 217 is formed on the first laminate layer, a second laminate layer 220, a third laminate layer 221, and a fourth laminate layer 222 were formed by the same manner, and further a polycarbonate substrate 218 having a diameter of 120 mm and a thickness of 0.6 mm was adhered on the film. Light was irradiated form this adhered substrate side. The materials used for the electrochromic layer 214 and the electrolyte layer 215 were the same as those used in Example 1.

The recording and reproducing methods were the same as those in Example 1. When a voltage was applied to the transparent electrodes at both sides of the information layer to be recorded or read during irradiation of the laser beam having a wavelength of 660 nm, only the layer became colored and absorbed and reflected the laser beam, so that selective recording and reading of information was achieved.

All the multi-layered films may be placed in the range of the focal depth of focusing lens, or alternatively, each layer may be recorded and reproduced by changing the focal point by means of inserting a spacer layer having a thickness of 20 to 40 μm at an interval of several layers (e.g., every three layers). In such a case, if two or more spacer layers are used, it is advantageous to provide a device for compensating the spherical aberration in the optical system.

With such a medium, it is possible to selectively record or reproduce information by coloring a particular layer. In this Example, the multi-layered film consisting of four laminate layers has been explained but recording and reproduction were possible with the medium consisting of eight laminate layers.

The media according to the present application are applicable in particular to multi-layered media suitable for high-density recording. The media are also higher in responding speed, and so high-speed writing can be achieved.

What is claimed is:

1. An information-recording medium comprising:
   a conductive polymer layer to be colored by application of a voltage;
   an electrode layer for coloring the conductive polymer layer by applying the voltage; and an electrolyte layer, wherein said electrolyte layer is a solid electrolyte and said solid electrolyte contains an ion conductive polymer and an electrolyte salt, said electrolyte layer contains a compound that reacts chemically by light-energy irradiation, and conductivity of a region where said compound is chemically reacted is different from that of a region other than the region having been reacted chemically.

2. The information-recording medium according to claim 1,
wherein the chemical reaction by said light-energy irradiation is thermal decomposition.

3. The information-recording medium according to claim 1,
wherein the chemical reaction by said light-energy irradiation is a crosslinking reaction.

4. The information-recording medium according to claim 1,
wherein said conductive polymer layer becomes in a polaron or bipolaron state, so that light absorbance of said conductive polymer layer is changed.

5. The information-recording medium according to claim 1,
wherein a plurality of sets of said conductive polymer layer, said electrode layer, and said electrolyte layer are present.

6. The information-recording medium according to claim 1,
wherein said ion conductive polymer is a polyalkylene carbonate.

7. The information-recording medium according to claim 1,
wherein the solid electrolyte further contains a thermally crosslinkable compound.

8. The information-recording medium according to claim 1,
wherein said conductive electrochromic polymer material contains at least one compound selected from polythiophene and a derivative thereof, polypyrrole and a derivative thereof, and polyaniline and a derivative thereof.

9. The information-recording medium according to claim 1,
wherein said electrode layer is made of one of ITO (indium tin oxide), IZO (indium zinc oxide), and tin oxide $SnO_2$.

10. The information-recording medium according to claim 1,
wherein said electrode layer is composed of a pair of electrode layers, and
said pair of electrode layers is composed so as to be sandwiched between said conductive polymer layer and said electrolyte layer.

11. The information-recording medium according to claim 10, further comprising:
a plurality of sets of said pair of electrode layers, said conductive polymer layer, and said electrolyte layer.

12. The information-recording medium according to claim 6,
wherein said polyalkylene carbonate has a content of 30% or more and 50% or less.

13. A information-recording method comprising the steps of:
using an information-recording medium comprising:
a conductive polymer layer to be colored by application of a voltage;
an electrode layer for coloring the conductive polymer layer by applying the voltage; and
an electrolyte layer having at least one of a thermally decomposable property and a thermally crosslinkable property, wherein said electrolyte layer is a solid electrolyte and said solid electrolyte contains an ion conductive polymer and an electrolyte salt;
applying a voltage to said electrode layer; and
thereafter irradiating said medium with light and recording information.

14. The information-recording method according to claim 13,
wherein said recording is made by laser irradiation or laser heating.

15. The information-recording method according to claim 13,
wherein the information is recorded in such a manner that light transmission of said light-irradiated area becomes high in comparison with that of an area irradiated with no light.

16. The information-recording method according to claim 13,
wherein said information-recording medium has a plurality of sets of said conductive polymer layer, said electrode layer, and said electrolyte layer, and
light is irradiated after a voltage is applied to a predetermined set of electrode layers among said plurality of sets during said recording.

17. The information-recording method according to claim 16,
wherein information is recorded on said predetermined set of conductive polymer layers when light transmission of said predetermined set of conductive polymer layers is small than that of other set of conductive polymer layers.

18. The information-recording method according to claim 13,
wherein said voltage is applied intermittently.

* * * * *